(12) United States Patent
Brewer et al.

(10) Patent No.: US 10,393,164 B2
(45) Date of Patent: Aug. 27, 2019

(54) LOCKBOLT

(71) Applicant: AVDEL UK LIMITED, Sheffield (GB)

(72) Inventors: Jonathan Brewer, Dunstable (GB); Carl Hersant, Hertford (GB)

(73) Assignee: AVDEL UK LIMITED (GB)

( * ) Notice: Subject to any disclaimer, the term of this patent is extended or adjusted under 35 U.S.C. 154(b) by 629 days.

(21) Appl. No.: 14/914,908

(22) PCT Filed: Nov. 6, 2014

(86) PCT No.: PCT/IB2014/065857
§ 371 (c)(1),
(2) Date: Feb. 26, 2016

(87) PCT Pub. No.: WO2015/033330
PCT Pub. Date: Mar. 12, 2015

(65) Prior Publication Data
US 2016/0215808 A1    Jul. 28, 2016

(30) Foreign Application Priority Data
Sep. 9, 2013 (GB) .................................. 1315989.2

(51) Int. Cl.
*F16B 19/05* (2006.01)
*B21J 15/02* (2006.01)

(52) U.S. Cl.
CPC .............. *F16B 19/05* (2013.01); *B21J 15/022* (2013.01)

(58) Field of Classification Search
CPC .... F16B 19/05; F16B 19/1054; F16B 31/028; F16B 37/00; B21J 15/022; B21J 15/043;
(Continued)

(56) References Cited

U.S. PATENT DOCUMENTS 1,629,925 A * 5/1927 Moore .................. B25B 31/005
                                                    29/238
3,091,982 A * 6/1963 Siebol .................... B21J 15/022
                                                    29/509
(Continued)

FOREIGN PATENT DOCUMENTS

CA       2788797 A1 *  3/2013  ............ B23P 19/062
GB       858882 A       1/1961
(Continued)

OTHER PUBLICATIONS

International Search Report and Written Opinion, completed Jan. 16, 2015, PCT/IB2014/065857.

*Primary Examiner* — Jacob J Cigna
*Assistant Examiner* — Lee A Holly
(74) *Attorney, Agent, or Firm* — Vorys, Sater, Seymour & Pease, LLP; Rex W. Miller, II

(57) ABSTRACT

A lockbolt for installation into apertured workpiece members, comprising a pin having a head and a tail end provided with locking grooves and a single pull groove (20), wherein an installation tool having a collet with a corresponding shape to the pull groove is used to apply an increasing pulling force to the pin tail, thereby to push the collet towards the workpiece, and as the force applied by the hydraulic piston further increases, causing the collar (10) to be swaged into the lock grooves, and halting the force applied by the tool either at a predetermined maximum value or when the pin tail breaks at a breaker groove formed by the single pull groove.

20 Claims, 20 Drawing Sheets

(58) Field of Classification Search
CPC .. B21J 15/05; B21J 13/06; B21J 15/04; Y10T 29/49915; Y10T 29/53735
See application file for complete search history.

(56) References Cited

U.S. PATENT DOCUMENTS

| | | | | |
|---|---|---|---|---|
| 3,295,404 | A * | 1/1967 | Baker | B21J 15/022 411/361 |
| 3,996,784 | A * | 12/1976 | Champoux | B21J 15/022 29/517 |
| 4,254,809 | A | 3/1981 | Schuster | |
| 4,299,519 | A | 11/1981 | Corbett | |
| 4,995,777 | A * | 2/1991 | Warmington | F16B 19/05 411/361 |
| 5,213,460 | A * | 5/1993 | Sadri | F16B 19/1054 411/361 |
| 5,315,755 | A | 5/1994 | Fulbright et al. | |
| 6,213,699 | B1 * | 4/2001 | Sadri | F16B 19/1054 411/34 |
| 2008/0170926 | A1 * | 7/2008 | Taylor | B21J 15/043 411/43 |
| 2009/0047060 | A1 * | 2/2009 | Turner | F16B 31/028 403/27 |
| 2013/0202382 | A1 * | 8/2013 | Corbett | F16B 37/00 411/361 |

FOREIGN PATENT DOCUMENTS

| | | | |
|---|---|---|---|
| JP | 1980094011 | A | 7/1980 |
| JP | 1997025922 | A | 1/1997 |
| WO | 8700891 | A1 | 2/1987 |
| WO | 2014041328 | A1 | 3/2014 |

* cited by examiner

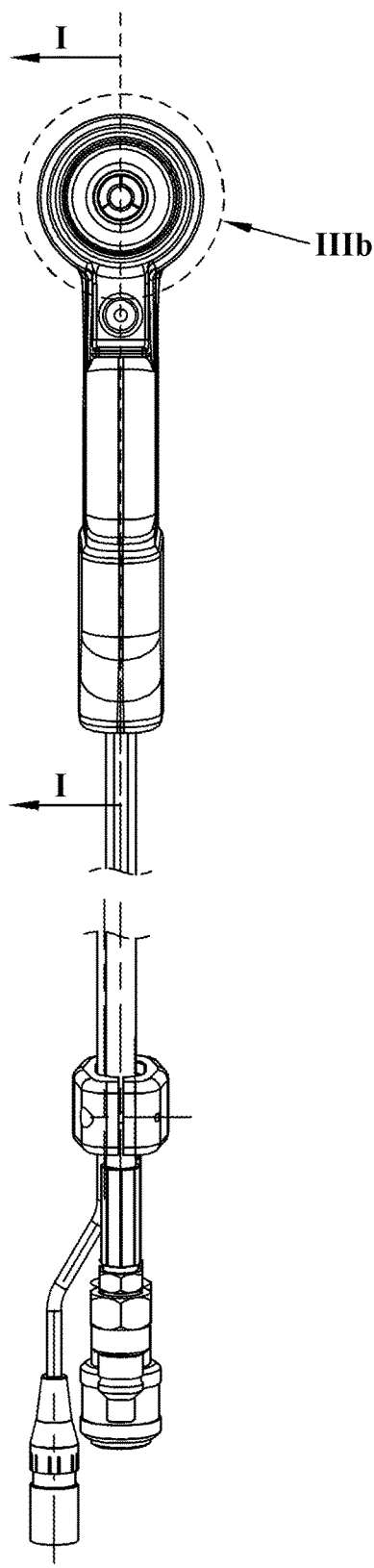
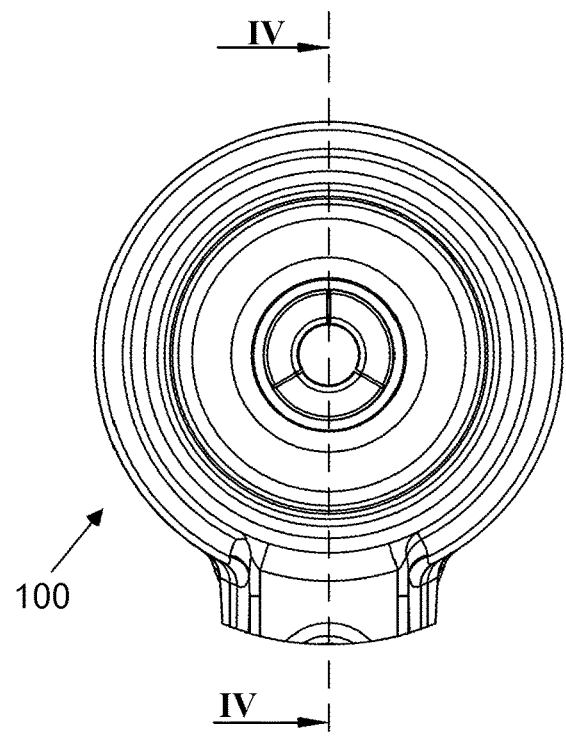
Figure 3b
Figure 3a

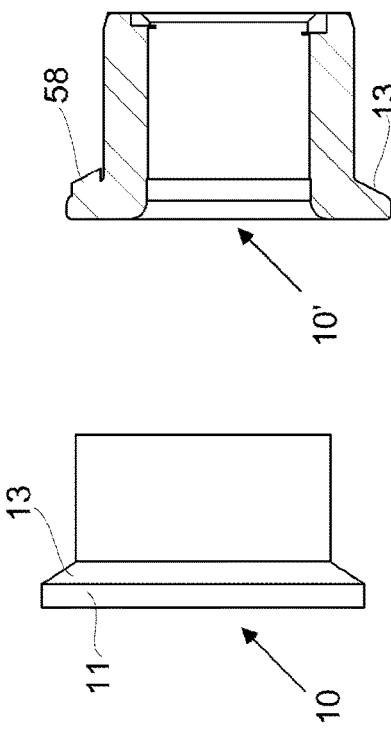
Figure 5c
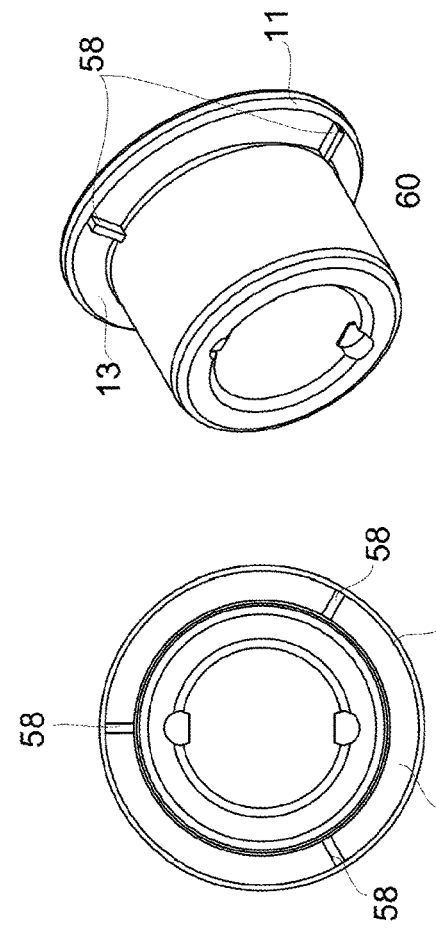
Figure 5d
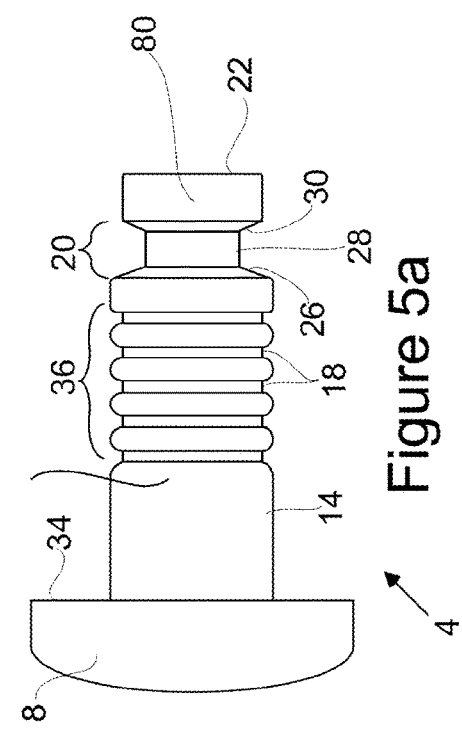
Figure 5a
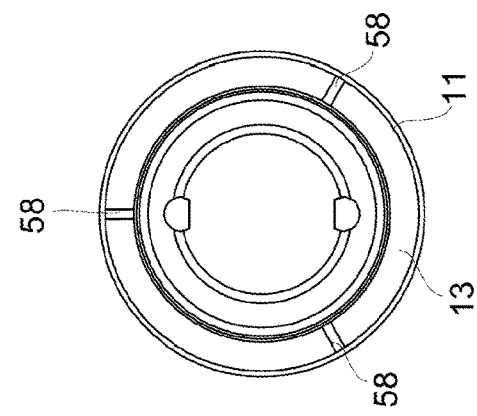
Figure 5e
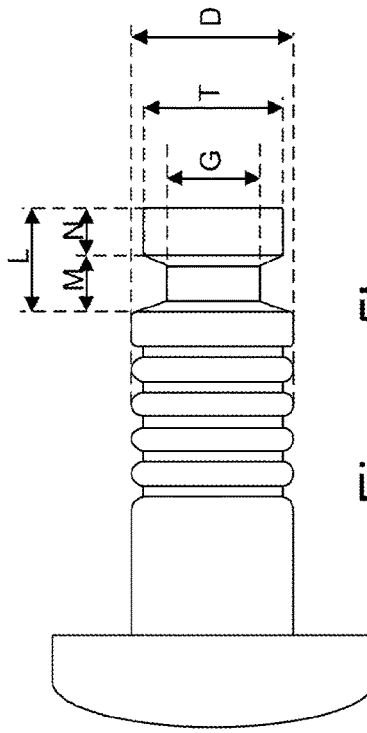
Figure 5f
Figure 5b

LOCKBOLT

This invention relates to a lockbolt fastener for securing apertured workpiece members together.

A known lockbolt fastener, as disclosed in UK patent GB2444420 (Huck International Inc.), comprises a pin having a short, small diameter pin tail which does not break on installation of the fastener into a workpiece. The lockbolt of GB'420 comprises a plurality of pull grooves provided on the pin portion, which are engaged by a plurality of collet teeth provided on the installation tool.

A problem with the non-breakstem lockbolt fastener as disclosed in GB2444420 is that the crests of the teeth of the installation tool may not engage sufficiently with the shallow grooves provided on the pin, e.g. the crests of the teeth may be caused to close directly onto the crests of the pull grooves, which can cause increased loads and slippage, thereby causing damage to the tool and/or fastener.

It is also possible for the tool teeth not to engage all fastener pulling grooves in an axial direction, which can lead to overstressing and stripping of the loaded pulling grooves on the fastener.

The multiple pull grooves and tool teeth of the prior art embodiments are also sensitive to angled entry into the collet, therefore the operator is required to check that the fastener is correctly aligned within the collet before actuating the tool.

A further disadvantage of the current non-breakstem lockbolt fasteners such comprising a plurality of pull grooves is that the narrow, shallow pull grooves, and also the shallow pulling teeth on the tool, can easily become clogged with debris, particularly in dirty working environments. Fine pitch multiple groove collet teeth are also much more vulnerable to damage by sand and small stones common to the outdoor environments in which these heavy duty lockbolt fasteners are often used (e.g. building of solar power plant structures in desert locations).

Manufacturing of multiple pull grooves lockbolts requires complex and therefore expensive thread rolling tooling, and the multiple pull groove forms generated on the pin are difficult and time consuming to inspect in production, therefore increasing time and cost of production.

Multiple collet teeth on an installation tool require small radii around the teeth, which increases stresses and leads to premature cracking. These teeth are also more complex to manufacture and inspect, and so are more costly.

Furthermore, any misalignment of the collet teeth and the pulling grooves, or pitch error between the teeth and the pulling grooves due to normal manufacturing tolerances, may result in an uneven distribution of pulling load and therefore generate higher localised stresses that lead to premature failure.

Some currently known non-breakstem lockbolt fasteners also include helical locking grooves into which the collars are swaged, which can be disadvantageous in that tampering or working loose could lead to the collar becoming unscrewed from the locking grooves.

Furthermore, the protruding end of the installed lockbolt could include sharp pull groove crests, therefore presenting a risk of injury to the operator or other personnel.

Known lockbolt fasteners can also include relatively wide locking grooves having a relatively high groove depth, i.e. a relatively broad pitch, thereby limiting the number of grooves, provided over the length of the locking portion. As the number of surfaces for interlocking with the collar when swaged is also therefore reduced, the overall strength of the installed lockbolt is accordingly limited. Furthermore, on swaging of the collar onto deep locking grooves, incomplete filling of the grooves by the collar material can occur, thereby further reducing the overall strength of the installed lockbolt.

It is an aim of the present invention to provide a lockbolt which overcomes the above disadvantages.

Accordingly the present invention comprises, in a first aspect, a lockbolt in accordance with claim 1 of the appended claims.

As the present invention has only a single relatively large pull groove, rather than a plurality of relatively small pull grooves, this enables easier operator engagement of the tool with the pin, as angular alignment and axial positioning are less critical than with prior art embodiments comprising multiple pull grooves. On engagement of the tool with the lockbolt, the deep pull groove allows the lockbolt to be maintained in an initial position relative to the tool; even if the lockbolt is at an angle relative to the longitudinal axis of the tool, the angular positioning of the lockbolt will be corrected on actuation of the tool. Because alignment and positioning are less critical than with prior art embodiments, it is quicker and simpler for the operator to enter the pin into the tool nose, thereby leading to improved installation productivity.

The single pull groove of the present invention is less likely to become clogged with debris than the shallower multiple grooves of prior art embodiments.

The lockbolt of the present invention can be manufactured more simply and cheaply than prior art multiple pull groove lockbolts. It is also much less susceptible to manufacturing tolerances, as the groove is much larger/deeper than previous embodiments, and therefore the effect of tolerances is much reduced. Furthermore, no pitch error is possible with the single pull groove.

The locking portion is preferably parallel in form, i.e. having a constant major diameter along its length.

The locking grooves of the present invention are entirely, or substantially, annular in form, and so ensure that separation of the collar from the pin by an unscrewing action cannot occur after installation of the lockbolt, e.g. the collar cannot become separated from the pin via rotation.

Preferably, the pitch of the locking grooves is in the range 0.40 mm to 2.13 mm, and the ratio of the major diameter of the locking portion to the pitch of the locking grooves is in the range 11.15 to 12.01. The relatively fine pitch of the locking grooves provides a greater number of interlocked surfaces with the collar over the length of the swaged area. This provides an increased nominal strength of fastening compared to that of prior art embodiments having broader pitch locking grooves. Furthermore, the relatively shallow form of the locking grooves ensures each of the grooves are almost completely filled with collar material when the collar is swaged onto the pin tail, thereby further increasing the strength of the installed lockbolt in tension. A shallower locking groove also means that the root diameter of the locking grooves 18 is larger and hence the cross sectional area of the pin is increased for improved strength in both shear and tension.

Preferably, the contact surface of the single pull groove is provided by a tapered portion.

Preferably, the end section of the pin tail of the lockbolt is shorter than the locking portion, and has a maximum diameter which is smaller than a maximum diameter of the locking portion.

Preferably, the ratio of the minimum diameter of the single pull groove to the maximum diameter of the locking portion is within the range 0.50 to 0.78.

Preferably, the ratio of the maximum diameter of the end portion to the maximum diameter of the locking portion, is within the range 0.7 to 1.0.

Preferably the ratio of the total length of the pin tail over which the pull groove and the end portion extends, to the maximum diameter of the locking portion, is within the range 0.7 to 1.2.

Preferably, the ratio of the length of the pin tail over which the pull groove extends, to the maximum diameter of the locking portion, is within the range 0.3 to 0.7.

Preferably, the ratio of the length of the pin tail over which the end portion extends, to the maximum diameter of the locking portion, is within the range 0.26 to 0.5.

Preferably, the pull groove includes a first tapered section and a second tapered section and a plain portion between the first and second tapered section, the groove root having a constant cross-sectional area throughout its length. Alternative embodiments could feature alternative profiles of pull groove.

Preferably, the lockbolt includes a retaining feature, which retains the collar in an initial assembly position on the pin after the operator has placed the pin and collar in the workpiece and before the installation tool is actuated to install the lockbolt by swaging of the collar. The retaining feature ensures that the collar will not fall from the pin tail before installation can be effected, which is particularly advantageous in difficult working conditions, such as when the pin axis is vertical with the tail end pointed down. In addition the retention prevents accidental pushing of the pin back out of the collar as the tool nose is being engaged onto the pin tail by the Operator. Furthermore engaging the retaining feature ensures the pull groove protrudes sufficiently from the collar to allow engagement of the tool nose and collet.

The retaining feature may comprise a shallow axial slot or flat provided on the pin tail, which allows a tab provided on the throughbore of the collar to pass down to a first locking groove into which the collar tab can be rotated to engage, i.e. in a 'push-and-twist' motion.

The retaining feature may alternatively comprise a short helical screw thread provided on a section of the locking portion adjacent the pull groove, and a corresponding short screw thread, helix or tab provided in the throughbore of the collar which engage. In this embodiment, on installation of the lockbolt, the collar swages predominantly or entirely into the annular locking grooves beyond, therefore there is no risk of unscrewing of the collar and pin.

A further alternative retaining feature may comprise an elastomeric bead or ring, provided either on the throughbore of the collar or on the locking grooves of the pin tail.

The collar and pin are pushed together thereby compressing the resilient bead or ring and generating a frictional force to resist separation.

Each of the retaining features described above provides a sufficient degree of retention force to maintain the collar on the pin until the installation tool is used for the next stage of installation. When the installation tool is actuated, the retention force is overcome by the swaging stroke of the installation tool, and is weak enough not to adversely influence the sheet take-up and swaging action of the collar during installation into the workpiece.

The pin tail of the lockbolt may further include a stepped portion adjacent the pull groove and between the pull groove and the end face of the pin tail remote from the pin head, wherein the stepped portion has a greater cross-sectional area than that of the end portion. The stepped portion provides a pin tail geometry which spreads loads and stresses effectively, whilst avoiding excessive pin tail weight.

Furthermore, the stepped end aids insertion of the pin tail into the tool collet prior to actuation of the tool.

The lockbolt may further comprise full swage indications means, to provide a visual indication that, during installation of the lockbolt, the collar has been fully swaged onto the pin locking grooves. The full swage indication means may comprise one or more projections or protrusions provided on an outer surface of a flange of the collar which are partially or fully deformed by the anvil of the installation tool.

Alternatively, the full swage indication means could comprise one or more projections or protrusions provided on an end face of the anvil of the installation tool, which are caused to indent the outer surface of the collar flange on installation of the lockbolt.

The portion of the pin tail that remains protruding from the swaged collar of the installed lockbolt is free of sharp features and therefore presents a lower risk of personal injury than do the pintails of prior art embodiments having multiple grooves with sharp crests to each groove.

In an alternative embodiment, the pin tail is configured to be broken off during installation of the lockbolt in a workpiece. This embodiment is advantageous in situations wherein the added weight or length of a pin tail cannot be accommodated. Furthermore, this embodiment is advantageous when the material of the pin does not present a corrosion risk at the fracture surface, e.g. stainless steel or aluminium alloy pins.

In further aspects, the present invention also provides apparatus for, and a method of, installing a lockbolt in accordance with the present invention, and a method of manufacturing a pin in accordance with the present invention, including a step of rolling the pin thereby displacing material and forming a stepped portion adjacent the pull groove, towards the tail end. The flow of metal during the roll-forming provides superior strength of pin tail compared to, for example, a machine-cut groove.

The collet of the installation tool used in the present invention does not protrude beyond the front of the nosepiece, and therefore presents a much lower risk of operator injury than prior art embodiments as the collet pulls in and closes together. There is also less chance of collet damage if the tool is dropped heavily.

The relatively large internal lip of the collet of the present invention is also less likely to become clogged with debris, or damaged by sand and small stones in dirty/outdoor working environments than the multiple fine pitch collet teeth of prior art tools.

As the collet internal lip of the present invention does not require the small radii at the root of pull jaw teeth that are required with prior art multiple pulling jaw tools, stresses on the internal lip will be lower than in the jaws of prior art tools, and premature cracking is much less likely.

The installation tool may further comprise a depressible plunger, wherein the tool is disabled whilst the plunger is not depressed. This provides a safety feature as the tool cannot be actuated accidentally.

The plunger may have a rounded tip, and a dimple may be provided in the end face of the lockbolt pin tail, whereby the rounded tip of the plunger is engageable with the dimple. The engagement of the rounded plunger tip ensures that the pin tail is in the correct position within the installation tool, i.e. that it is inserted fully in the axial direction within the tool nose, before actuation of the tool, thereby preventing damage to the tool or harm to the operator.

Preferably, part of the collet of the installation tool has a shape complementary to at least part of the shape of the pull groove.

When installing a lockbolt wherein the pin tail includes a stepped portion as described above, the stepped portion effectively provides an additional surface (in addition to the contact surface of the pull groove), for contact with the internal lip of the collet, thereby providing localised reinforcement of the pin tail on installation due to the greater cross-sectional area of the surface on which the installation tool contacts.

The lockbolt may further include a first plain portion between the pin head and the locking portion, and the ratio of the length of the first plain portion to the length of the locking portion is preferably within the range 0.62 to 1.27 for lockbolts having a grip capability of three times the nominal pin diameter. Ratios within this range ensure an increased shear strength of the lockbolt compared to one having a shorter plain section relative to the length of the locking portion due to the absence of locking grooves within the shear plane.

The invention will now be described by way of example only and with reference to the accompanying figures in which:

FIG. 3a is a front view of the installation tool of FIG. 1 (with the lockbolt removed for clarity), and illustrates at line I where a cross-sectional view is taken;

FIG. 3b is a detailed view of part of the installation tool as indicated at area IIIb on FIG. 3a;

FIGS. 5a and 5b are simplified side views of a lockbolt pin in accordance with the present invention, with collar retaining features removed for clarity;

FIG. 5c is a simplified side view of a lockbolt collar in accordance with the present invention;

FIG. 5d is a longitudinal cross-sectional view of an alternative lockbolt collar in accordance with the present invention including full swage indication means;

FIG. 5e is an end view of the alternative lockbolt collar of FIG. 5d;

FIG. 5f is an isometric view of the alternative lockbolt collar of FIG. 5d;

FIG. 18b is a side view of the alternative collar of FIG. 18a;

FIG. 18c is an isometric view of the alternative collar of FIG. 18a;

FIG. 19b is an isometric view of the anvil of FIG. 19a; and

FIG. 19c is a side view of the anvil of FIG. 19a.

Figure 1:
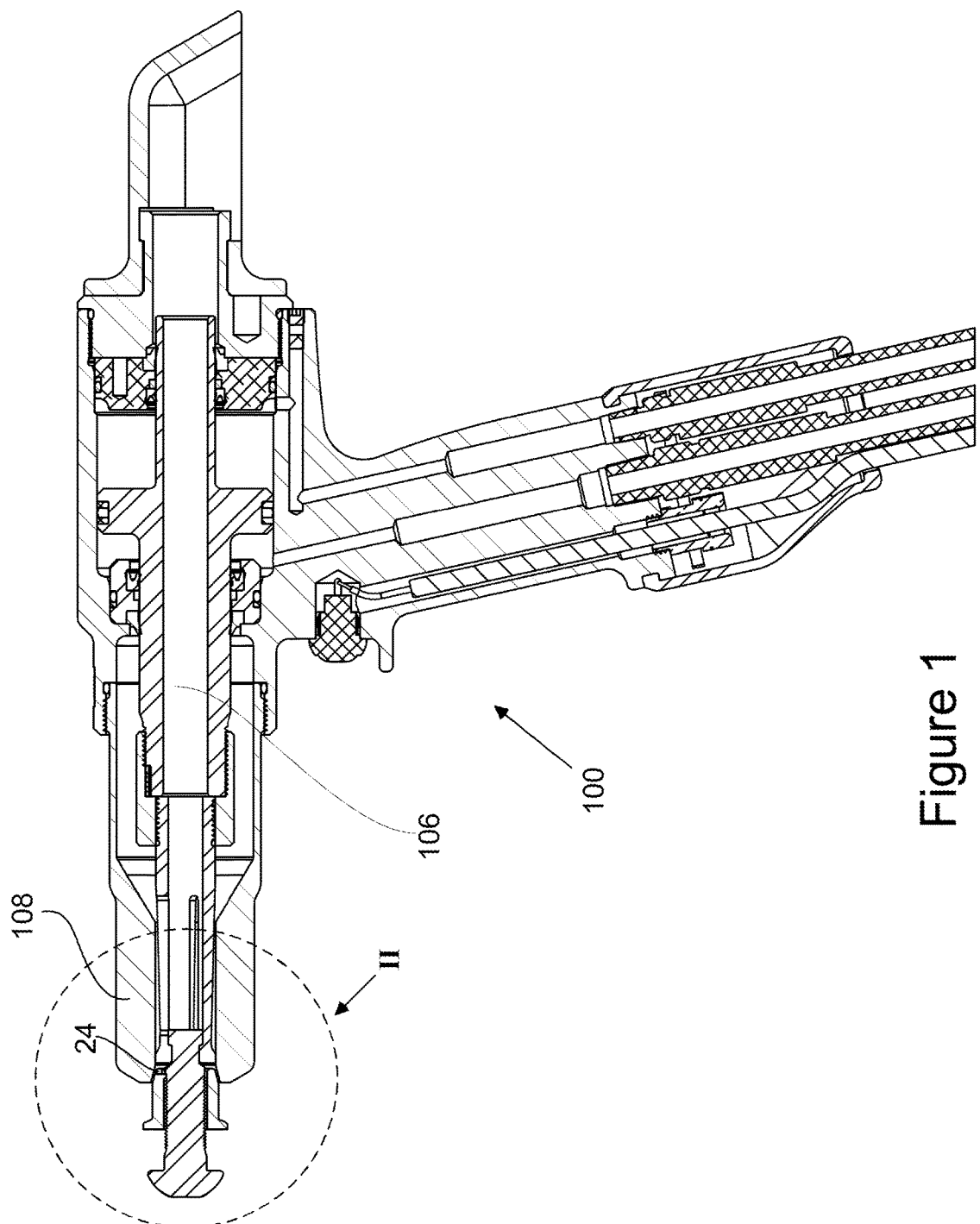
FIG. 1 is a cross-sectional side view of a lockbolt according to the present invention inserted into a hydraulically powered installation tool ready for installation of the lockbolt into a workpiece (the workpiece is shown in later figures)

Referring to the figures, a lockbolt 2 in accordance with a first aspect of the present invention comprises a pin 4 comprising a pin tail 6 and a pin head 8, and a collar 10 having a throughbore 12 (FIG. 7) and a flange 11 having an outer surface 13. The pin tail 6 includes a locking portion 36 comprising annular locking grooves 18, a first plain portion 14 between the locking portion 36 and the pin head 8, and a single pull groove 20 between the locking portion 36 and end face 22 of the pin tail 6 remote from the pin head 8. The locking portion 36 has a major diameter D, as shown in FIG. 5b, and is parallel in form, i.e. it has a constant major diameter along its length. An end portion 80 is provided between the locking grooves 18 and the end face 22 of the pin tail 6. The end portion 80 is plain, and has parallel sides, i.e. a constant cross-sectional area throughout its length. Furthermore the end portion 80 is short, relative to the length of the locking portion 36, and is of a smaller maximum diameter than the maximum diameter of the locking portion 36. In an exemplary embodiment, where D is the maximum diameter of the locking portion 36, G is the minimum diameter of the pull groove 20 (in the embodiment shown in the figures, the minimum diameter of the pull groove 20 is at a groove root 28), and T is the maximum diameter of the end portion 80, the following applies:

G=0.675 D (and more generally is within the range 0.50 D to 0.78 D);

T=0.836 D (and more generally is within the range 0.7 D to 1.0 D).

Furthermore, wherein L is the total length of the pin tail 6 over which the pull groove 20 and end portion 80 extend, N is the length over which the end portion 80 extends, and M is the length over which the pull groove 20 extends, the following applies:

L=0.936 D (and more generally is within the range 0.7 D to 1.2 D);

M=0.581 D (and more generally is within the range 0.3 D to 0.7 D);

N=0.355 D (and more generally is within the range 0.26 D to 0.5 D).

Examples of length of the plain portion 14, the length of the locking portion 36, and the resulting ratio of first plain portion length to locking portion length, for a range of pins of nominal diameter ranging from 4.8 mm (3/16") to 25.4 mm (1") are provided in Table 1 below; in each case the pin length selected is one capable of fastening a total joint thickness of at least three times the nominal pin diameter. The ratio of the length of the first plain portion 14 on the pin tail, to the length of the locking portion 36, is typically in the range 0.62 to 1.27.

TABLE 1

| Nominal pin diameter (mm) | First plain portion length (mm) | Locking portion length (mm) | Ratio |
|---|---|---|---|
| 4.8 | 8.81 | 14.13 | 0.62 |
| 6.4 | 14.67 | 17.71 | 0.83 |

TABLE 1-continued

| Nominal pin diameter (mm) | First plain portion length (mm) | Locking portion length (mm) | Ratio |
|---|---|---|---|
| 7.9 | 17.56 | 20.52 | 0.86 |
| 9.5 | 20.60 | 23.10 | 0.89 |
| 12.7 | 29.98 | 31.58 | 0.95 |
| 15.8 | 36.33 | 36.63 | 0.99 |
| 19.0 | 49.03 | 43.13 | 1.14 |
| 22.2 | 61.73 | 48.39 | 1.28 |
| 25.4 | 68.08 | 53.59 | 1.27 |

Examples of the major diameter D of the locking portion 36, the pitch of the locking grooves 18, and the resulting ratio of locking portion major diameter to locking groove pitch, are provided in table 2 below, for a range of pins of nominal diameter ranging from 4.8 mm (3/16") to 25.4 mm (1"). The pitch of the locking grooves 18, is typically in the range 0.40 mm to 2.13 mm, and the ratio of the major diameter D of the locking portion 36 to the pitch of the locking grooves 18 is typically in the range 11.15 to 12.01.

TABLE 2

| Nominal pin diameter (mm) | Locking portion major diameter (mm) | Lock groove pitch (mm) | Ratio |
|---|---|---|---|
| 4.8 | 4.65 | 0.40 | 11.62 |
| 6.4 | 6.06 | 0.53 | 11.36 |
| 7.9 | 7.61 | 0.67 | 11.41 |
| 9.5 | 9.26 | 0.80 | 11.57 |
| 12.7 | 12.45 | 1.07 | 11.67 |
| 15.8 | 15.57 | 1.40 | 11.15 |
| 19.0 | 18.67 | 1.57 | 11.85 |
| 22.2 | 21.97 | 1.83 | 12.01 |
| 25.4 | 25.10 | 2.13 | 11.76 |

The single pull groove 20 includes a first tapered section 26, a second tapered section 30 (the second tapered section 30 being closer to the tail end 22 of the pin 6 than the first tapered section 26), and the groove root 28, having a constant cross-sectional area along its length between the first tapered portion 26 and the second tapered portion 30, i.e. the groove root 28 is parallel to the axis of the pin tail 6.

FIGS. 6 to 15 show successive stages of installation of a lockbolt 2 into apertures 120, 122 of a workpiece comprising workpiece members 130 and 140, including using an installation tool 100, thereby to secure the workpiece members 130 and 140 together.

Figure 6:
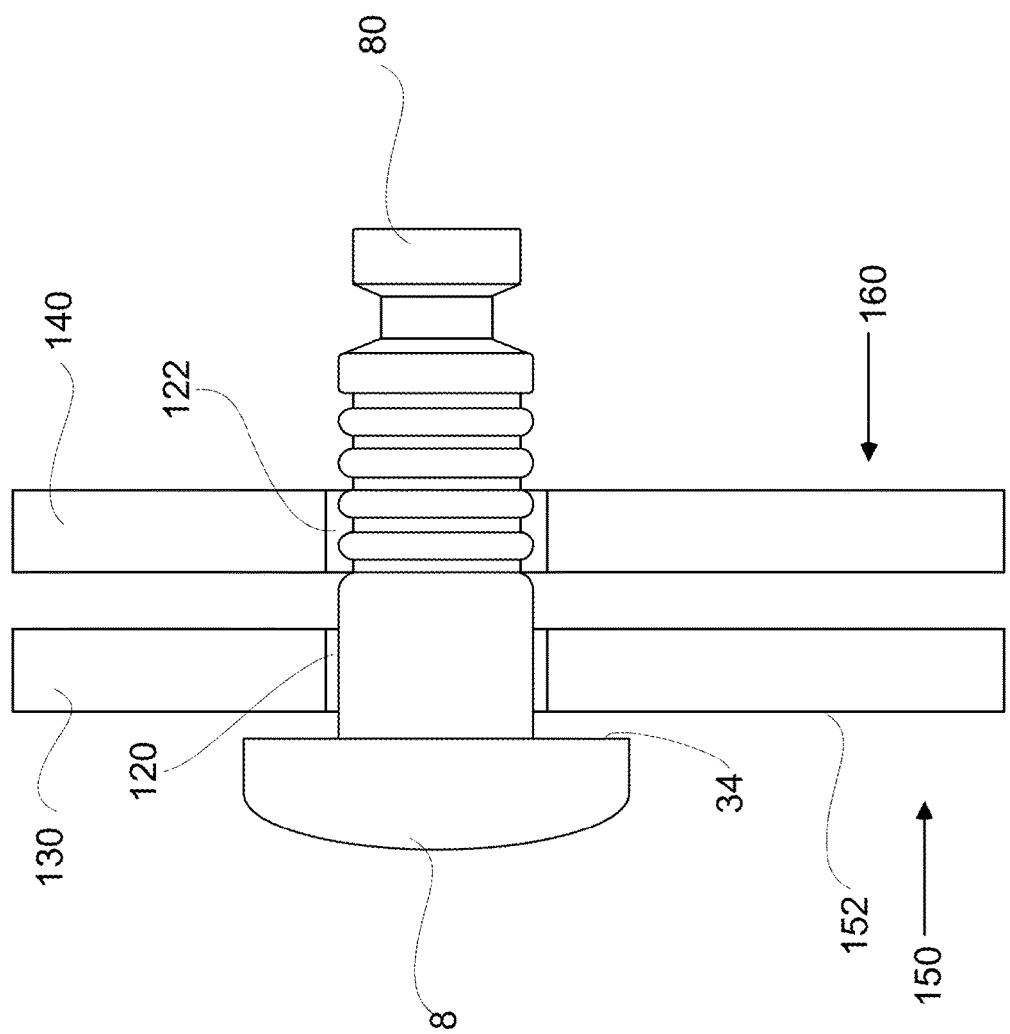
FIGS. 6 to 15 show stages of installation of a lockbolt in accordance with the present invention, the tool, workpiece and lockbolt being in cross-section or partial cross section.
Figure 7:
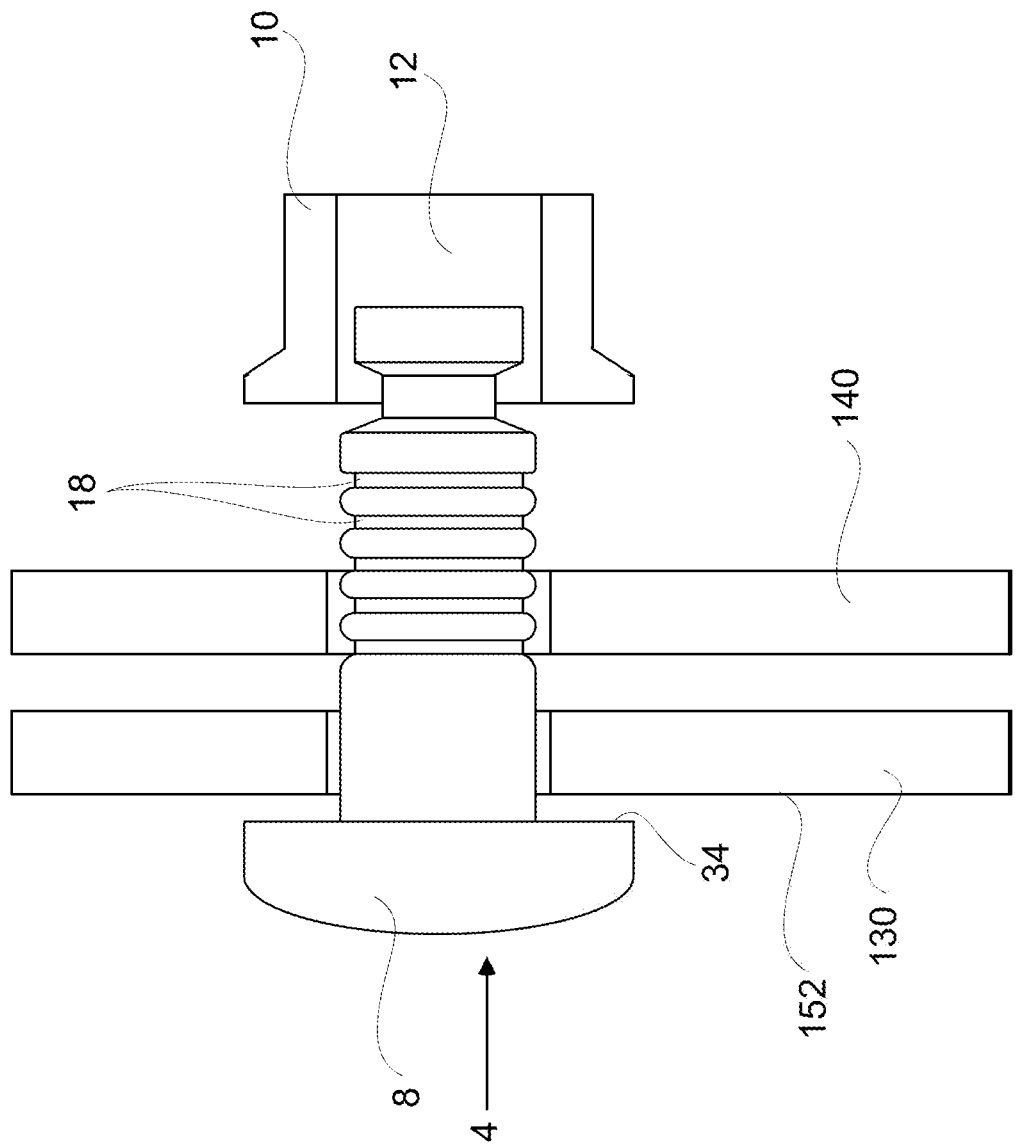
Figure 8:
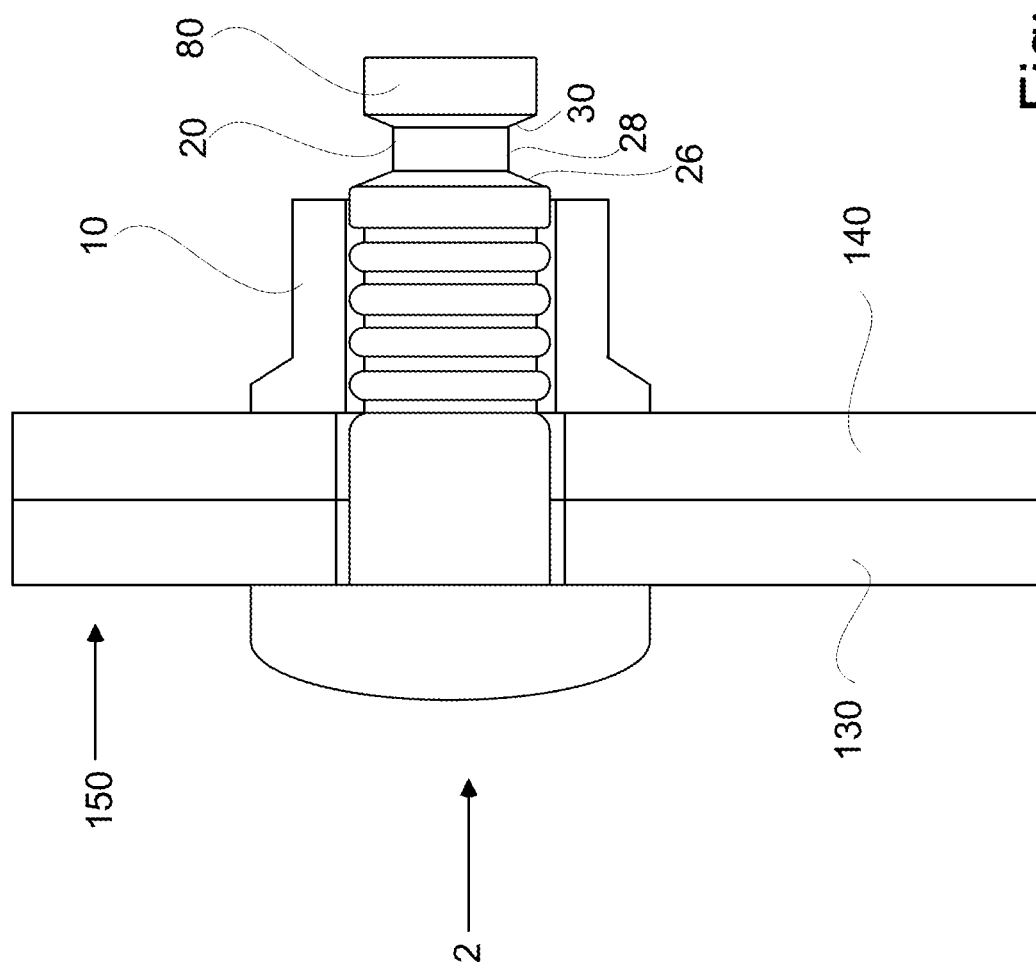
Figure 9:
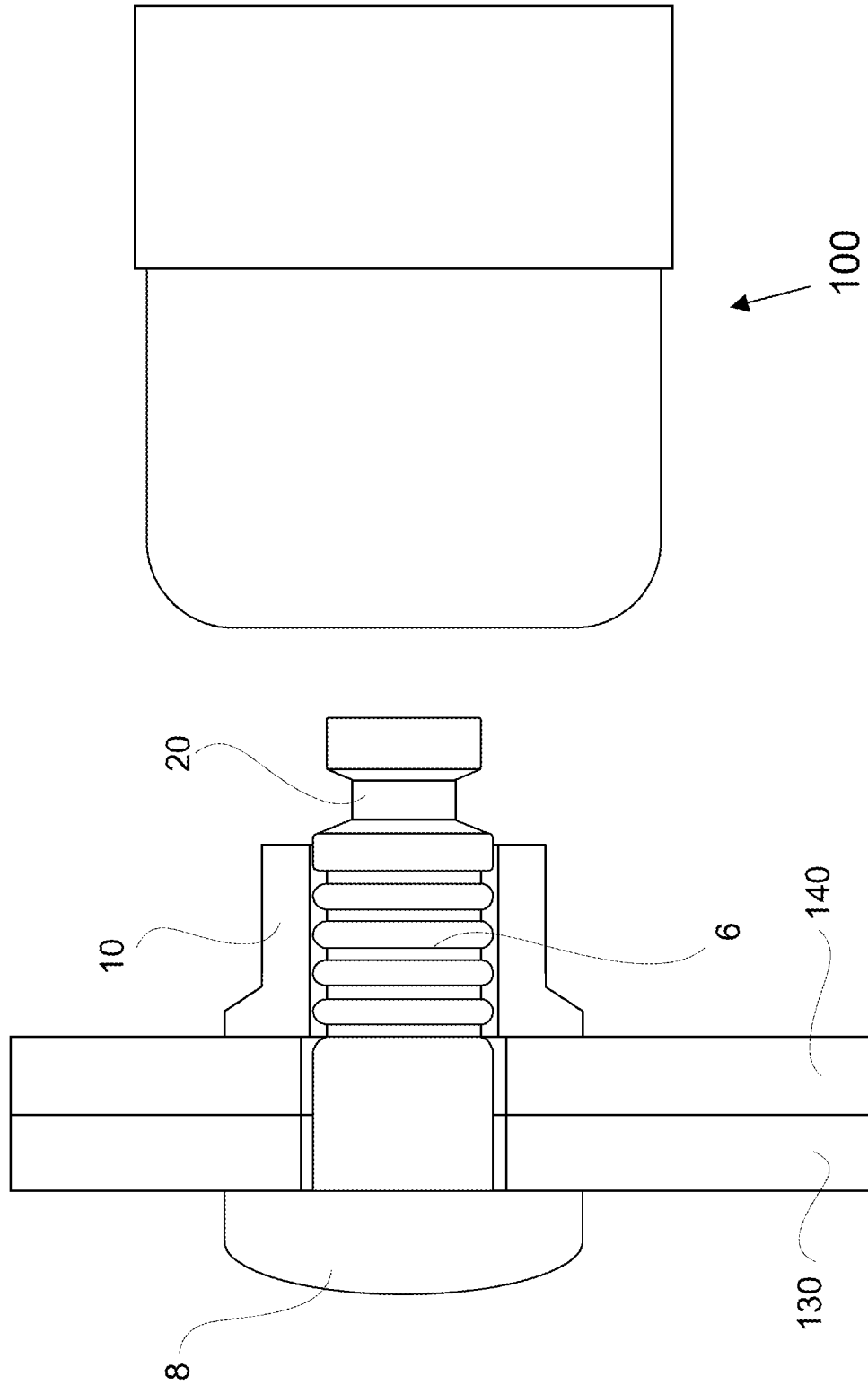
Figure 10:
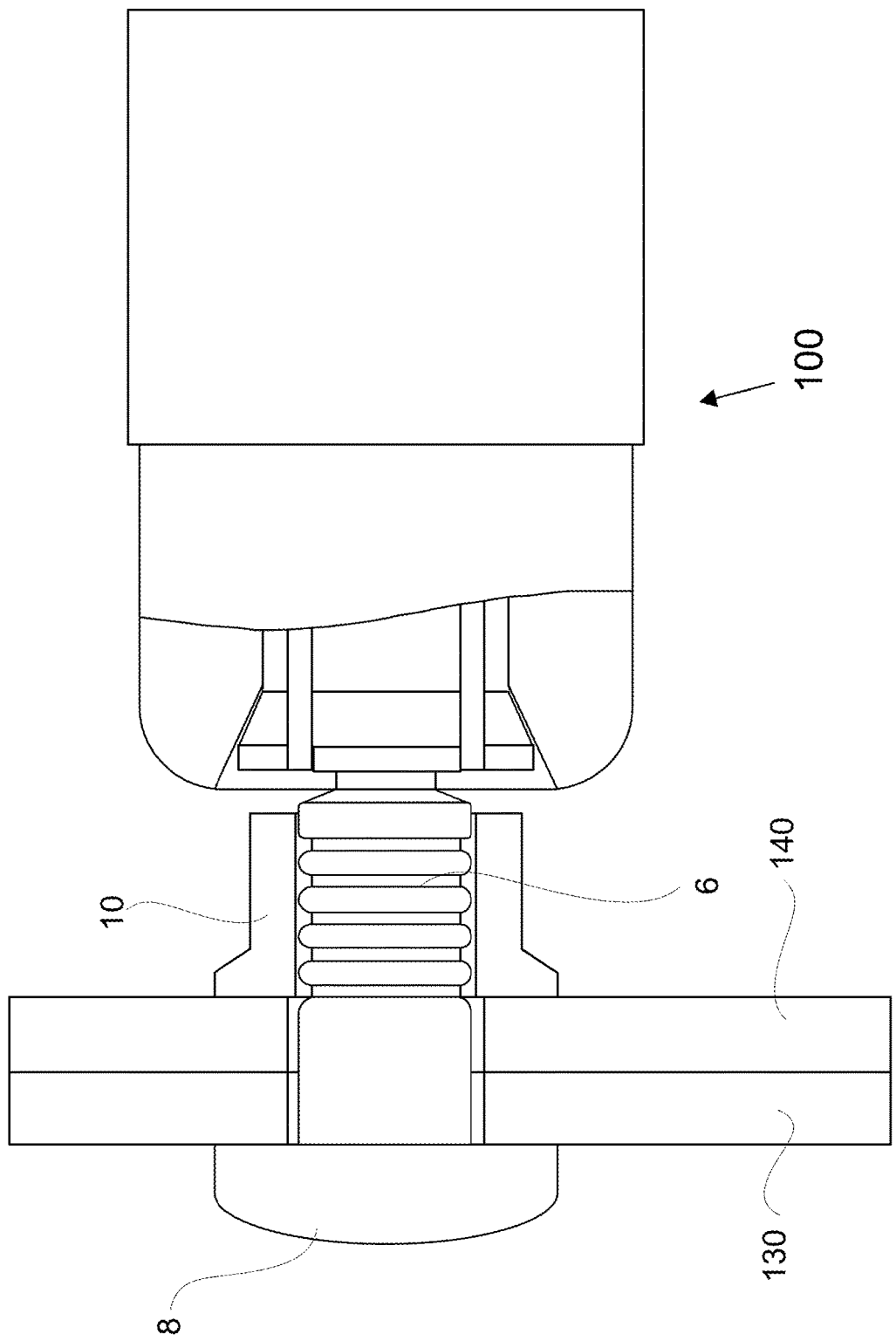
Figure 11A:
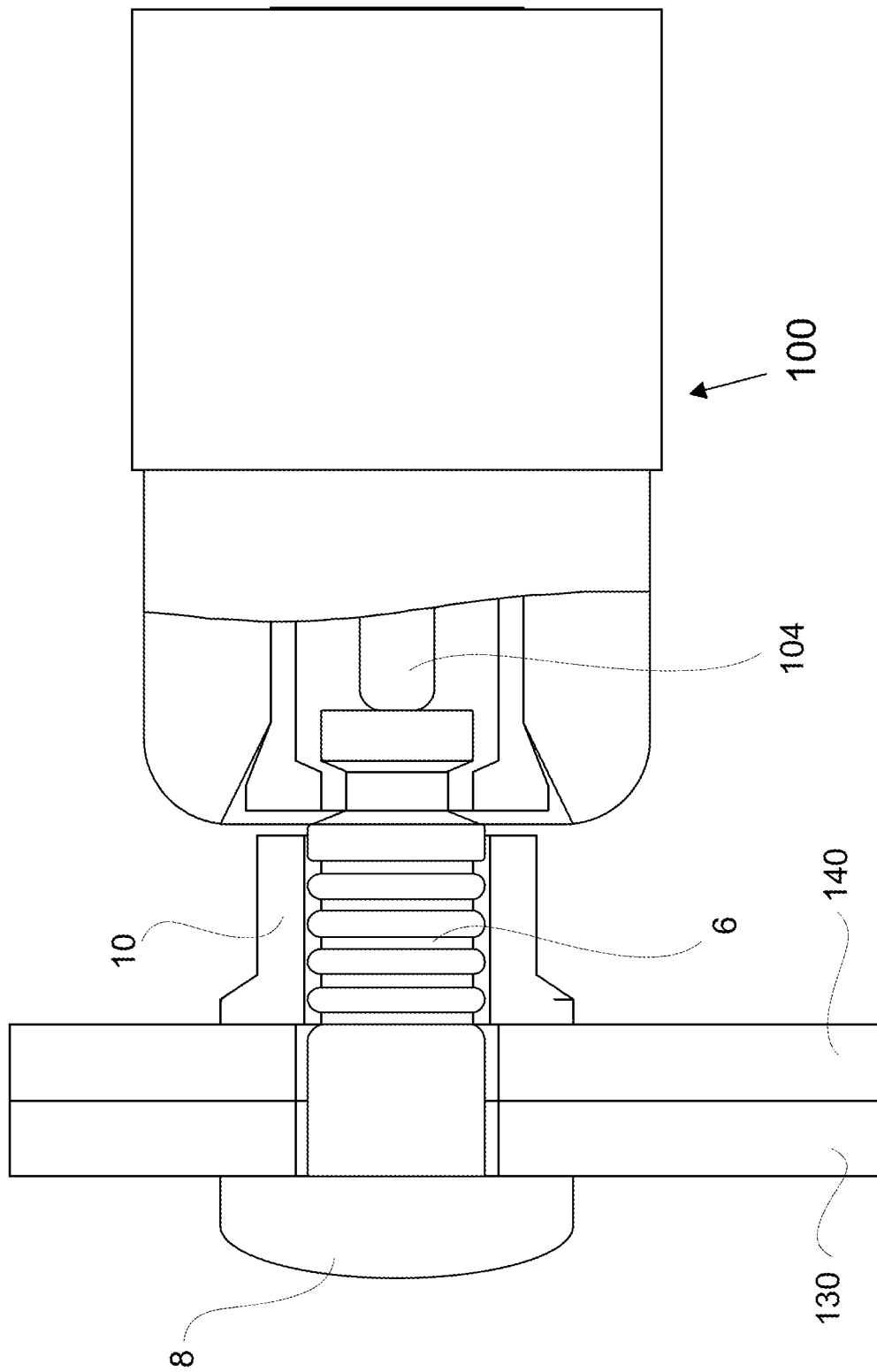
Figure 11B:
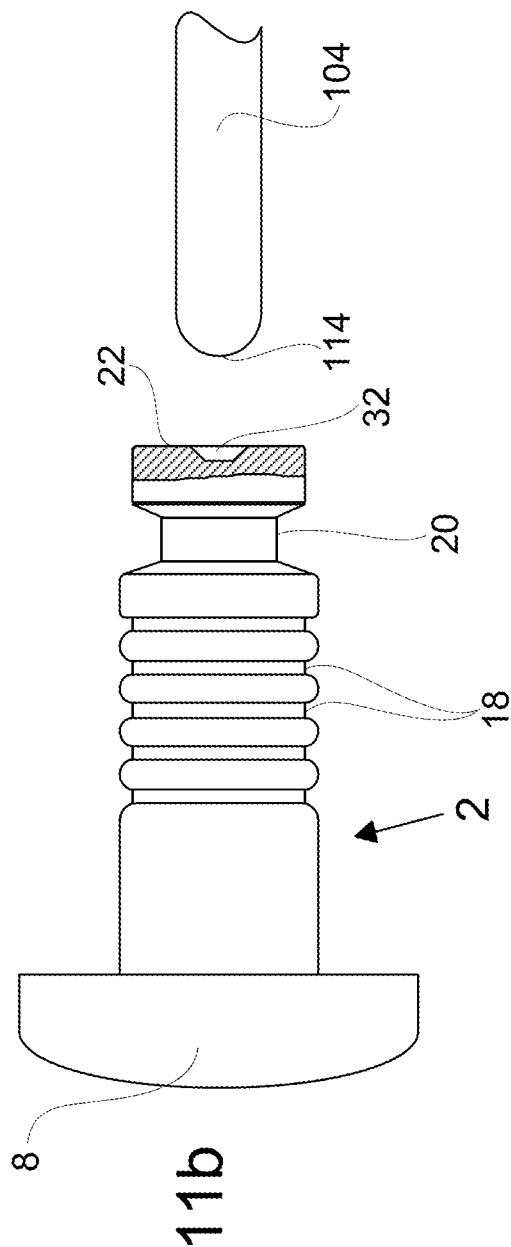
Figure 11C:
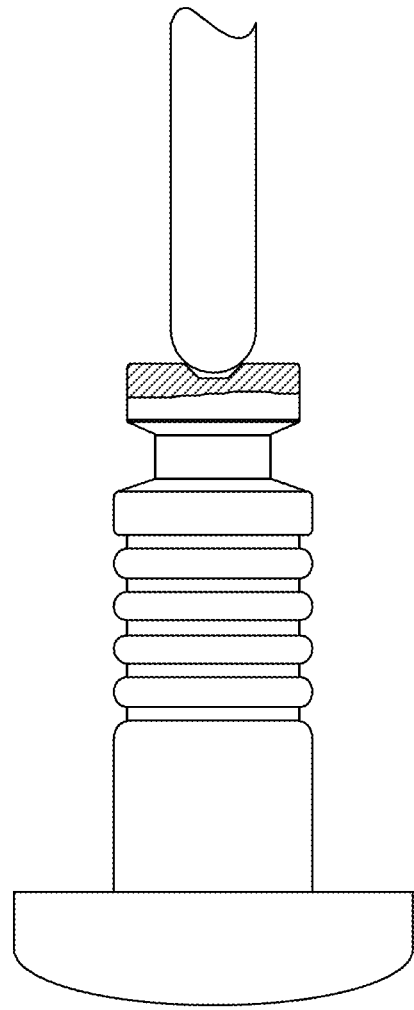
Figure 12:
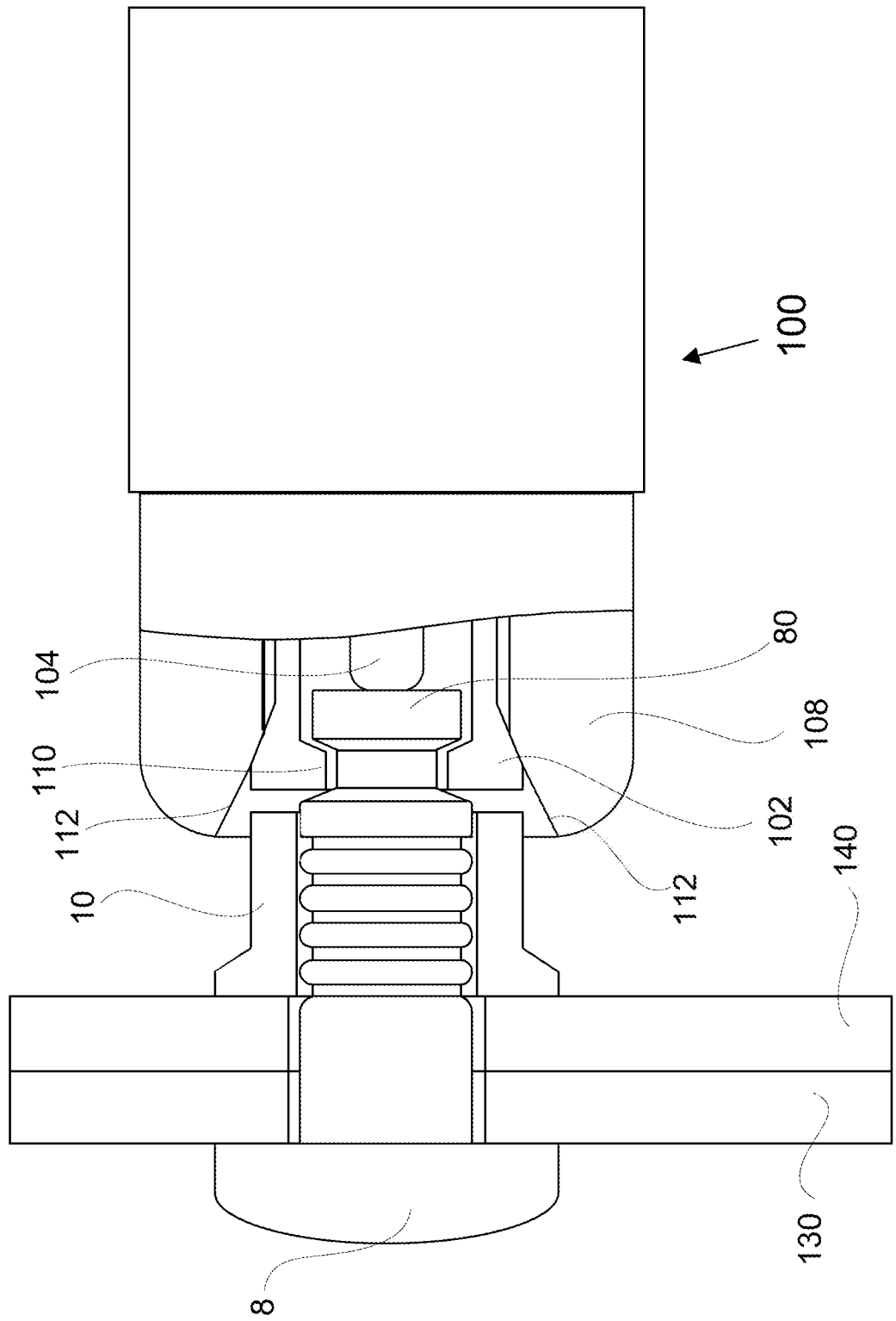
Figure 13:
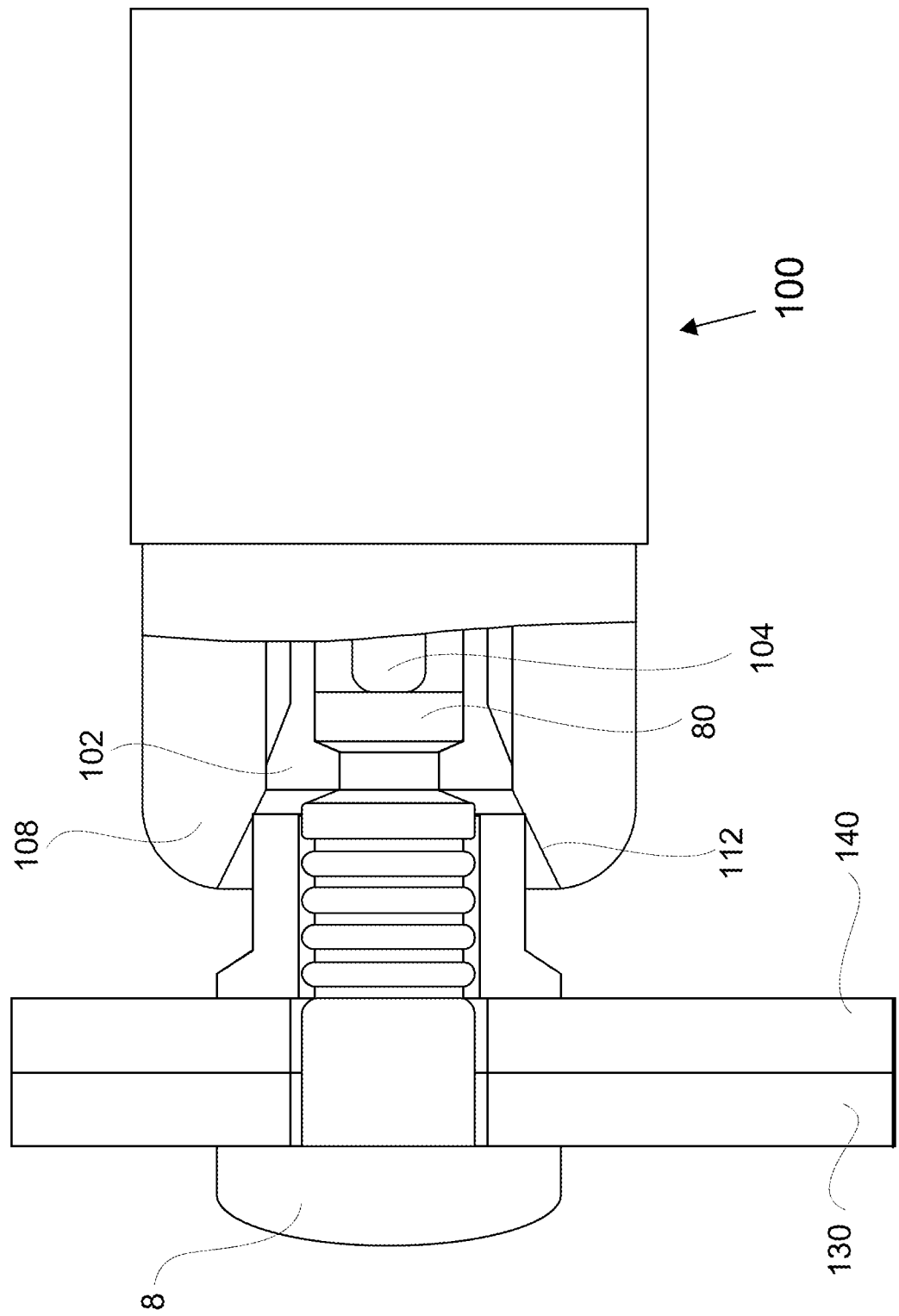
Figure 14:
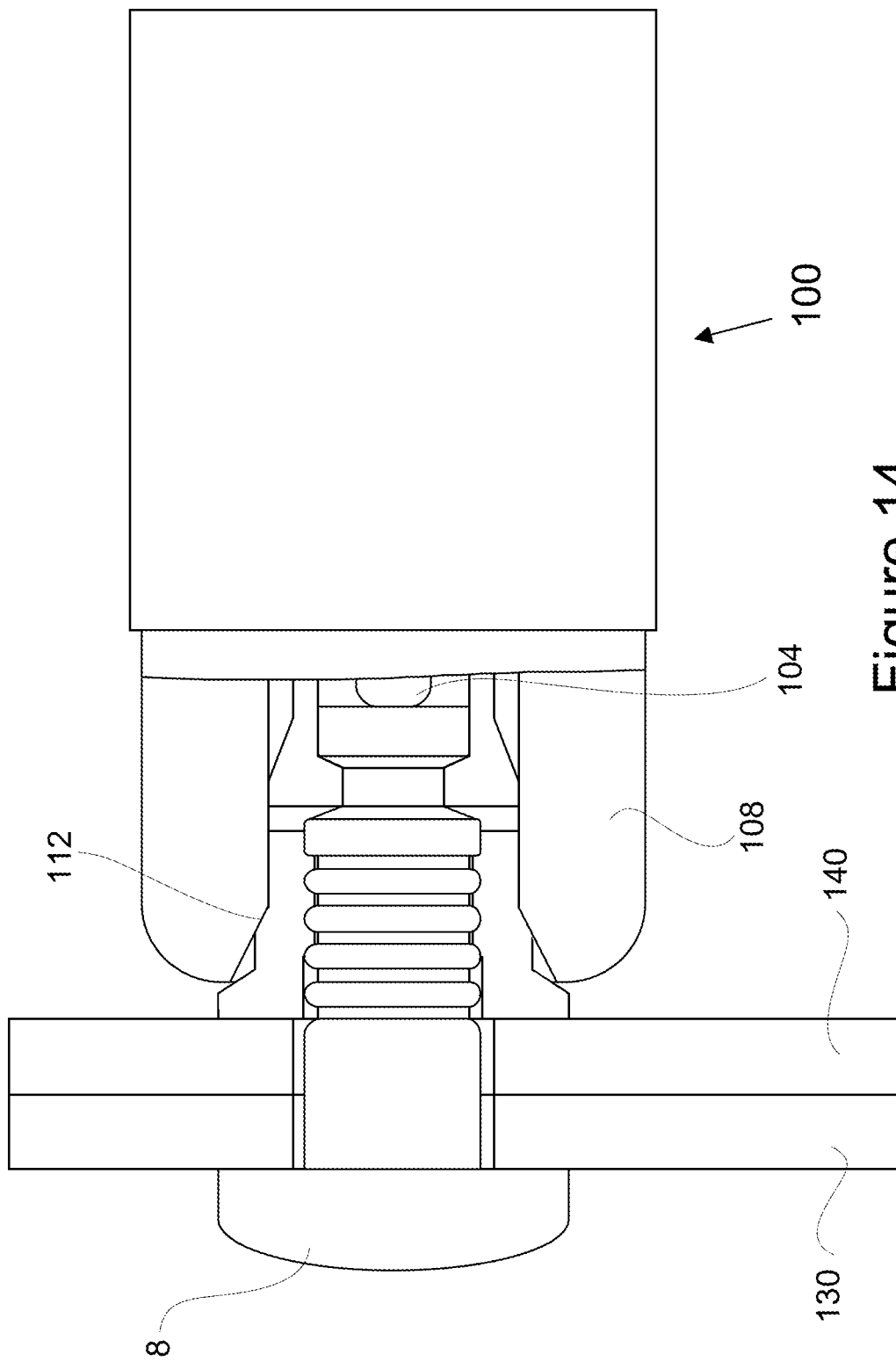
Figure 15:
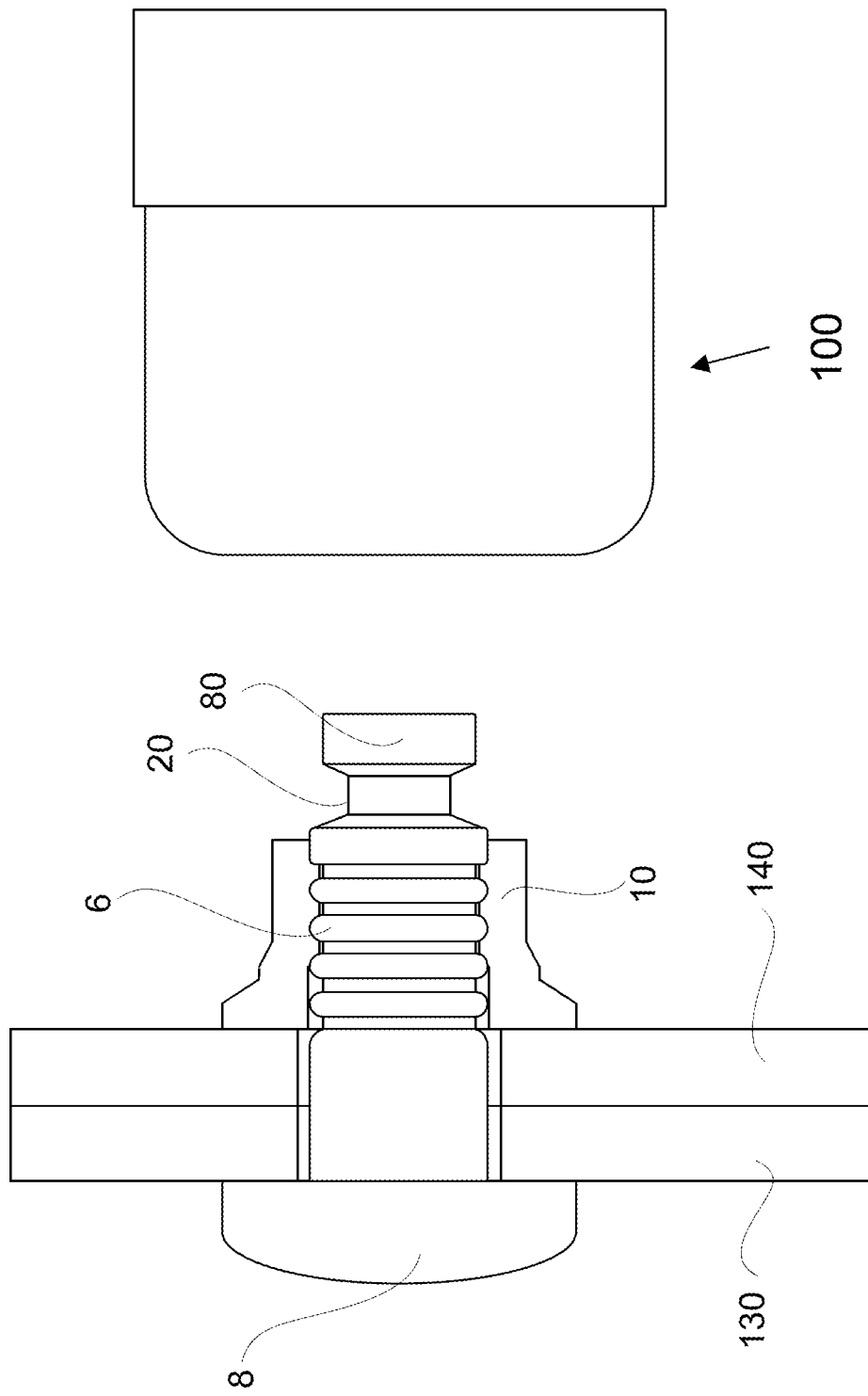

Initially, the pin 4 is inserted by an operator by hand into the apertures 120, 122 of the workpiece members 130, 140, from the rear side 150 of the workpiece, as shown in FIG. 6, until the underside 34 of the head contacts the rear surface 152 of the workpiece. At this stage, part of the pin tail 6 protrudes from the front side 160 of the workpiece. The collar 10 is then fitted by hand onto the protruding end of the pin tail 9, from the front side 160 of the workpiece, as shown in FIG. 7.

Figure 2:
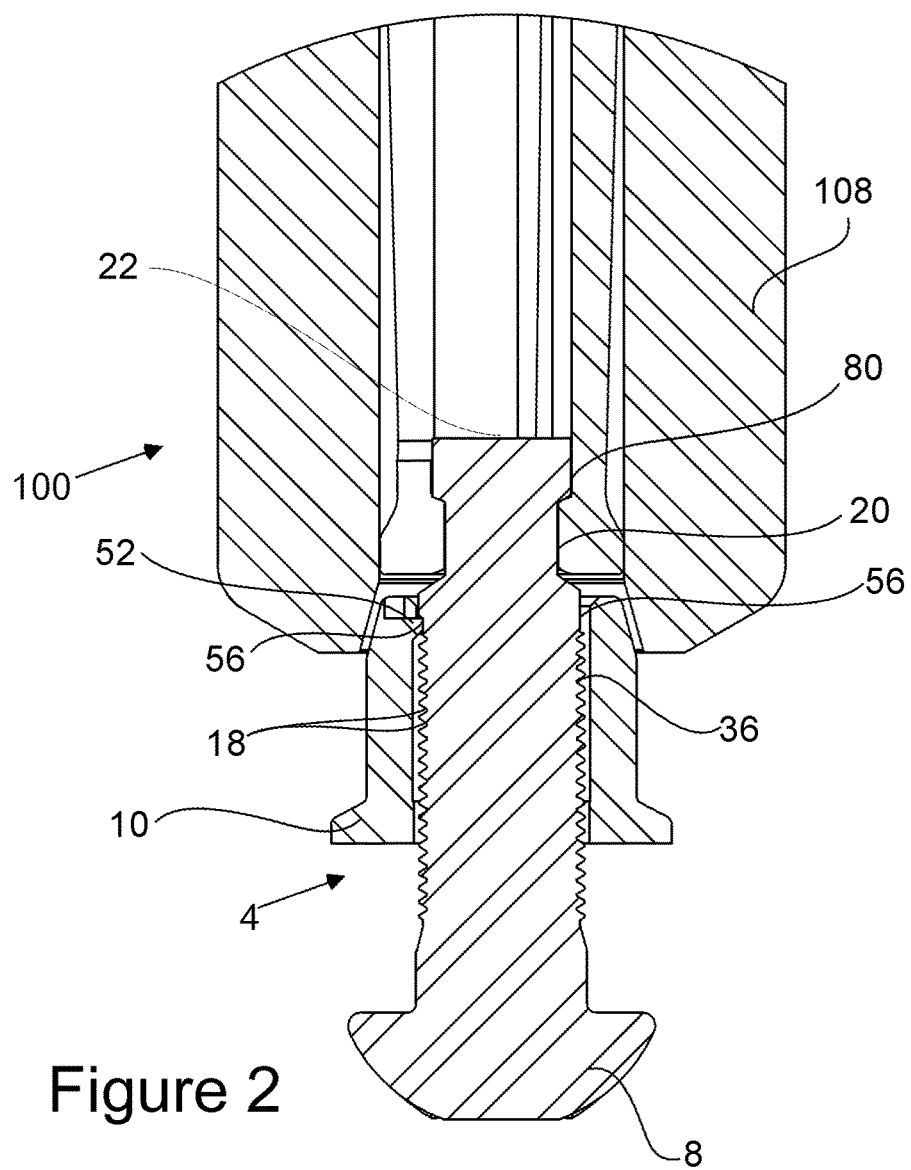
FIG. 2 is a detailed cross-sectional view of the lockbolt and installation tool of FIG. 1 indicated as area II on FIG. 1, with the retaining feature in an engaged condition.

After the collar 10 has been fitted onto the pin 4, the collar 10 is positively retained in an initial assembly condition (or an engaged position) on the pin 4. This positive engagement is achieved by a retaining feature 24. In the embodiment as shown in FIGS. 1 and 2, the retaining feature 24 is a 'push-and-twist' type feature, comprising a shallow axial slot 56 provided on the pin tail 6, and a tab 52 provided on the throughbore 12 of the collar 10. The axial slot 56 allows the tab 52 to pass down to the first locking groove 18 of the locking portion 36; the collar is then rotated by 180° thereby causing the tab 52 to engage the first locking groove 18. In FIG. 2, the retaining feature 24 is shown in an engaged position. For clarity, a retaining feature 24 is not shown in the installation sequence figures.

The retaining feature 24 provides a sufficient degree of retention force to maintain the collar on the pin until the installation tool is used for the next stage of installation. When the installation tool is actuated, the retention force is overcome by the swaging stroke of the installation tool, and is weak enough not to adversely influence the sheet take-up and swaging action of the collar 10 during installation into the workpiece.

The lockbolt 2 is then installed into the workpiece by use of the installation tool 100. The installation tool 100 includes a split collet 102 (FIGS. 10 to 14), surrounded by a nosepiece 108.

A sprung plunger 104 (FIGS. 11 to 14) having a rounded tip 114 (shown most clearly in FIGS. 11b and 11c) is provided within the installation tool 100, which engages with a dimpled recess 32 provided in the end face 22 of the lockbolt pin. The plunger is depressed by the end face 22 of the lockbolt pin 6 when the pin tail 6 is entered into the open collet 102. The engagement of the plunger 104 in the dimpled recess 32 ensures that the pin tail is in the correct position within the installation tool 100, i.e. that it is not tilted at an unacceptable angle relative to the tool axis. Depression of the plunger 104 allows the operator to commence installation of the lockbolt 2. Unsafe operation of the tool with a pin tail incorrectly positioned inside the tool collet, or with no pin and thus a greater risk of entrapment to the operator, is thereby avoided.

Upon actuation of the installation tool 100, a hydraulic piston 106 (shown in FIG. 1) exerts an increasing pulling force on the collet 102, thereby pulling the collet 102 into the tool 100, and thereby exerting a pulling force on the pin tail 6 via the pull groove 20. As the collet 102 is pulled into the tool 100, the tapered anvil portion 112 of the nosepiece 108 causes the collet 102 to close around the end of the pin tail 6, and an internal lip 110 of the collet 102 engages with the single pull groove 20, at the contact surface provided by second tapered section 30. In the embodiment illustrated herein, the internal lip 110 of the collet 102 has a shape complementary to at least part of that of the pull groove 20, i.e. complementary to the groove root 28 and the second tapered section 30 of the pull groove 20, therefore the collet 102 engages the plain groove root 28 and the second tapered section 30.

The pulling force which is applied to the collet 102 by the hydraulic piston 106 is transferred to the pin tail 6 via the contact surface provided by the tapered portion 30 of the pull groove 20. Therefore as the collet 102 is pulled into the tool 100, the pin tail 6 is also pulled in towards the tool 100.

Subsequently, as the collet 102 is pulled further into the tool 100 by the hydraulic piston 106, the anvil portion 112 of the nosepiece 108 comes into contact with the collar 10, and the collar 10 is progressively pushed by the anvil 112, in the direction of the pin head 8. The workpiece members 130, 140 are thereby pushed together, closing any gap between them, and a clamp load is applied to the workpiece. As the force applied by the tool 100 increases, the anvil portion 112 gradually swages the collar 10 down into the locking grooves 18 of the pin tail 6, i.e. the material of the collar 10 is forced into locking grooves 18.

The force applied by the tool, and thereby also the swaging of the collar 10 onto the locking grooves 18, is halted when the force reaches a pre-set maximum value. The hydraulic piston 106 then returns to its pre-actuation position and the anvil portion 112 retracts from the fully swaged collar 10. When the collar 10 has been fully swaged onto the pin tail 6, the collar is securely fixed to the pin 4 and the two components cannot become accidentally separated.

Figure 16:
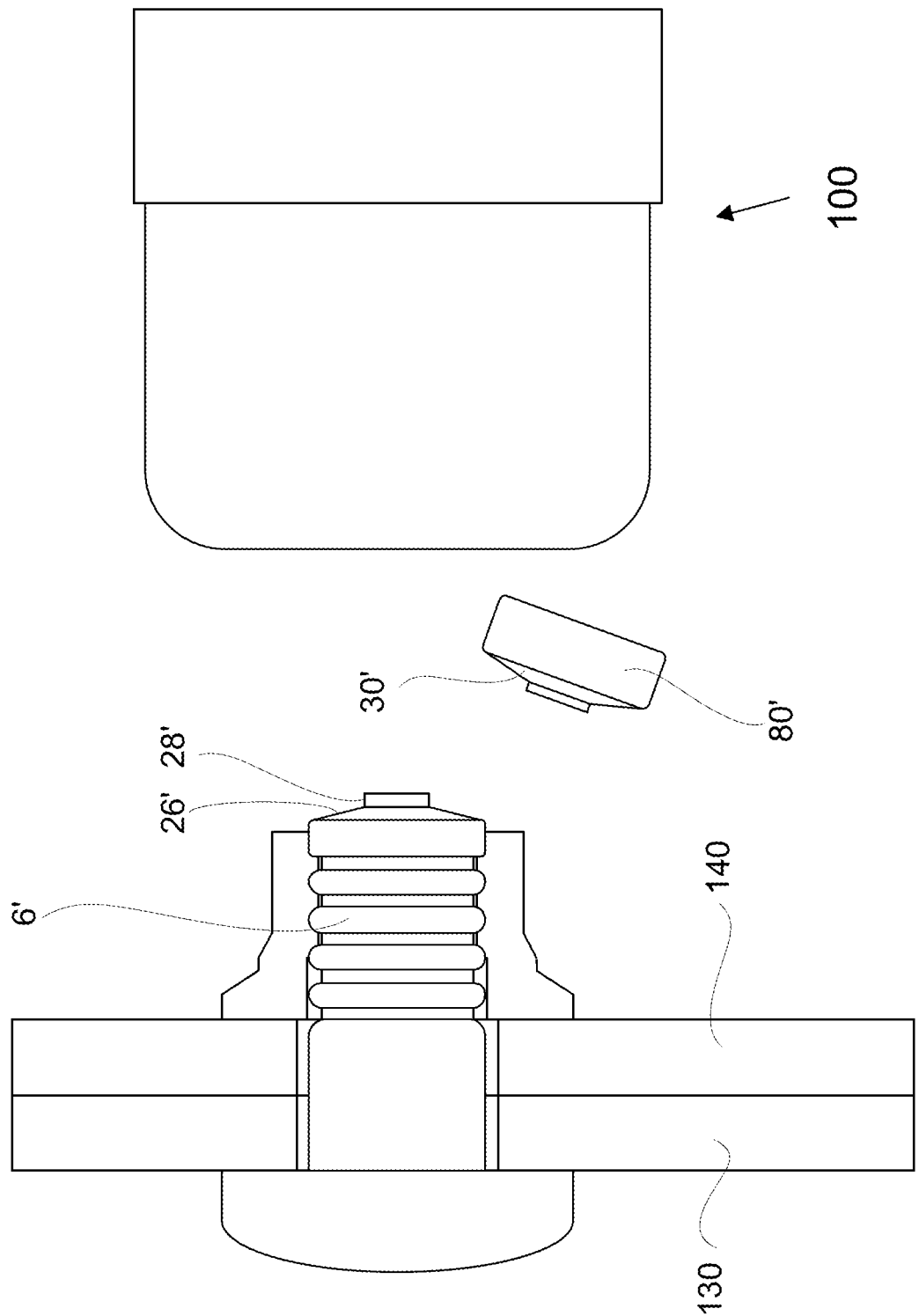
FIG. 16 shows an installation stage of an alternative embodiment of lockbolt in accordance with the present invention.

In the embodiment discussed above, the end of the pin tail 6 does not break off during installation of the lockbolt 2 into a workpiece. However, in the alternative embodiment of lockbolt 2' shown in FIG. 16, the end portion 80' of the pin tail 6' is caused to break off during installation, as a result of the single pull groove 20' being deeper than the pull groove 20 of the first embodiment, i.e. the first tapered section 26' and the second section 30' are steeper than those of the first portion (and as a result the groove root 28' has a smaller diameter). The pull groove therefore acts as a breaker groove. In this embodiment, the installation tool applies a pulling force to the pin tail 6' until the pin tail fractures at the breaker groove/pull groove 20. The broken-off pin portion 80' is ejected from the installation tool 100 after the installation cycle. In this embodiment, the form of the internal lip 110 of the collet 102 (not shown in FIG. 16) may not correspond to that of the pull groove 20', however the force of the tool will still be transferred to the pin tail 6' via the contact surface provided by the tapered section 30'.

In a further embodiment (not shown), the contact surface may be formed of an alternative feature of the pull groove, for example a shoulder, providing a contact surface 90° to the axis of the pin tail 6.

The retaining feature 24 may alternatively comprise a short helical screw thread 54 (shown in FIG. 2a) provided on a section of the pin tail 6" adjacent the pull groove 20, and a corresponding short screw thread, helix or tab provided in the throughbore 12 of the collar 10 into which the locking portion screw thread engages. As the collar 10 will be swaged predominantly or entirely into the annular locking grooves 18 beyond, there is no risk of unscrewing of the collar and pin tail 6.

In a further alternative embodiment, the retaining feature 24 could comprise an elastomeric bead or ring, provided either on the throughbore 12 of the collar 10 or on the locking grooves 18 of the pin tail 6.

Figure 2A:
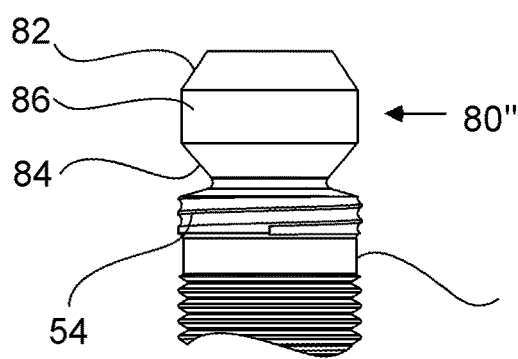
FIGS. 2a and 2b are partial side views of the pin tail of alternative lockbolts in accordance with the present invention.

In alternative embodiments, a pull groove having a different profile, for example only being comprised of the two tapered sections 26 and 30 and not having a parallel groove root 28, i.e. a groove root having a constant cross-sectional area along its length, may be provided. An example of a pull groove 20" having an alternative form is shown in FIG. 2a. Similarly, the form, profile and shape of the installation tool collet 102 may also differ. More specifically the form of the internal lip 110 of the collet 102 may not correspond partially to that of the pull groove 20. However, contact will still be made between the internal lip 110 of the collet 102 and a tapered portion of the pull groove.

The end portion 80 of the pin tail 6 as discussed above is plain, with a constant cross-section area along its length. However the end portion 80 may have a different profile, such as alternative end portion 80" shown in FIG. 2a, including two tapered portions 82 and 84 and a shorter plain portion 86 between the tapered portions 82 and 84.

Figure 2B:
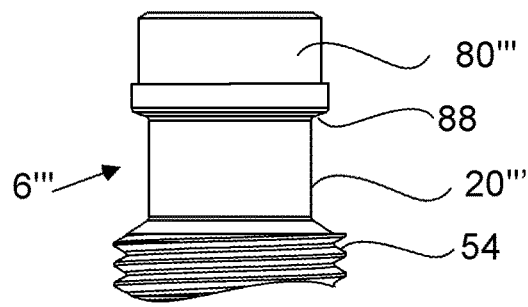
Figure 4:
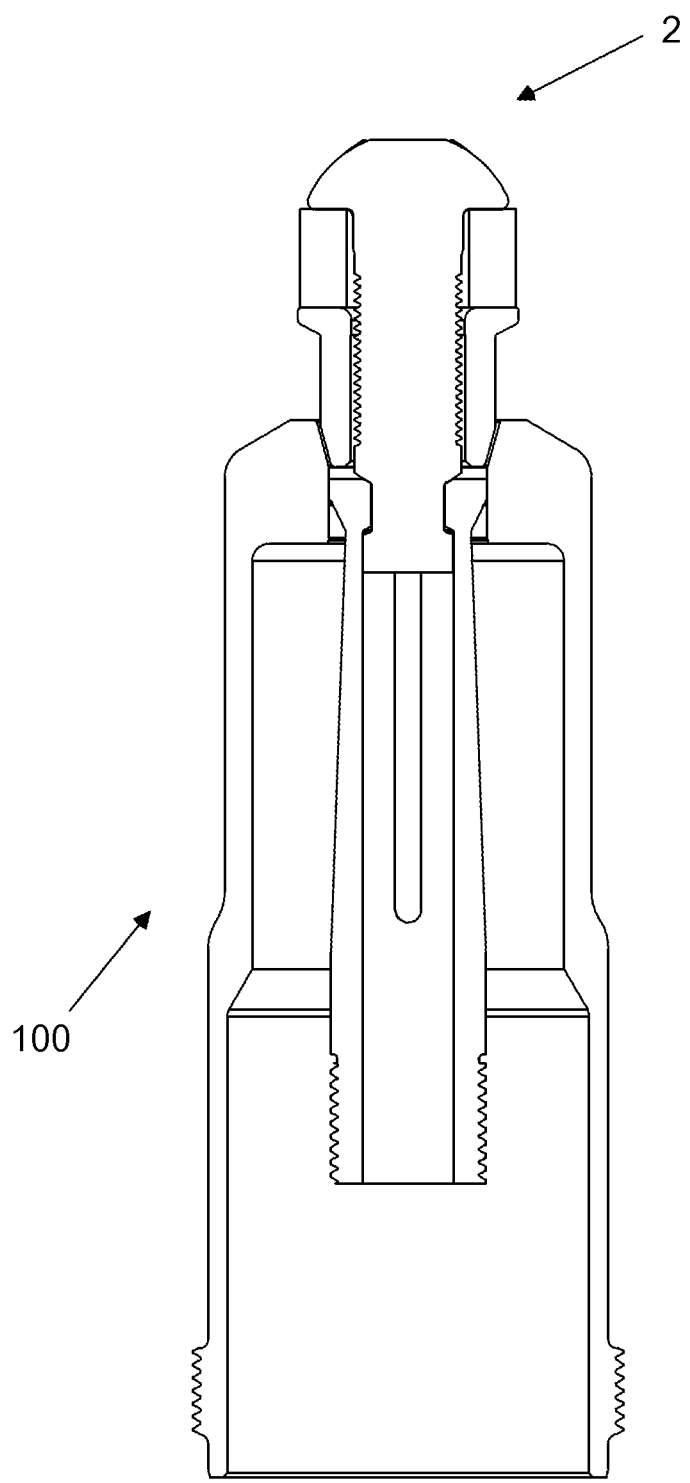
FIG. 4 is a cross-sectional view of the tool of FIG. 3b along the line IV-IV, ready to install a lockbolt in accordance with the present invention.

As shown in the alternative end portion of FIG. 2b, the pin tail 6 may include a stepped portion 88 adjacent the pull groove 20''', towards the end portion 80'''. The stepped portion 88 has a greater cross-sectional area than the plain end portion 80'''. It is produced by material displaced during rolling of the pin tail 6 during manufacturing; the flow of metal during the roll-forming provides superior strength of pin tail 6 compared to, for example, a machine-cut groove.

The stepped portion 88 provides a pin tail geometry which spreads loads and stresses effectively, whilst avoiding excessive pin tail weight.

The stepped portion 88 effectively provides an additional surface 90 (in addition to the contact surface of the pull groove 20''') for contact with the internal lip 110 of the collet 102, thereby providing localised reinforcement of the pin tail on installation due to the greater cross-sectional area of the surface on which the installation tool contacts.

Figure 17:
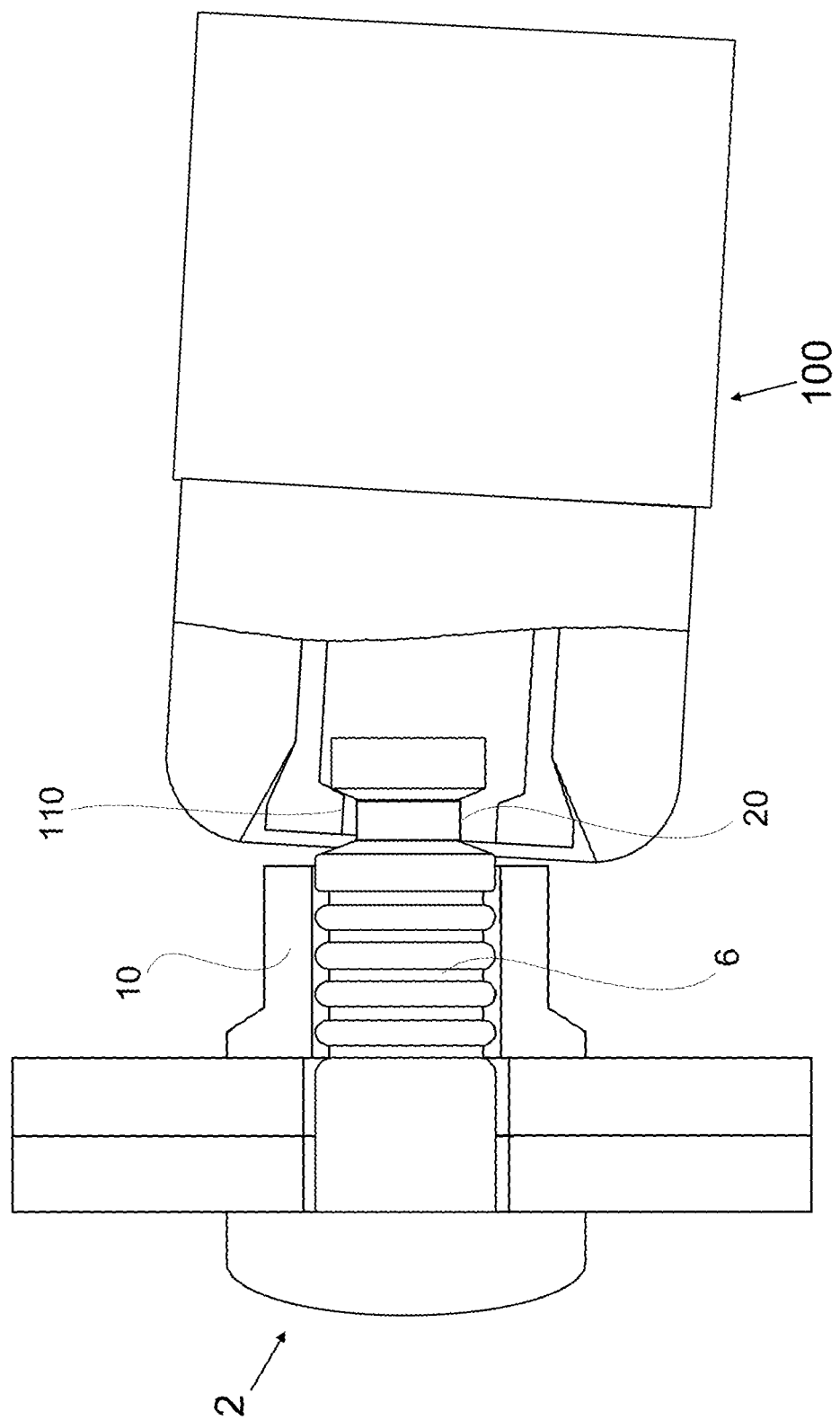
FIG. 17 shows an installation stage of an further alternative embodiment of lockbolt in accordance with the present invention.

Although the embodiment described above has a dimple provided in the end face of the lockbolt pin tail which is engaged by a plunger provided on the installation tool, in the alternative embodiment shown in FIG. 17, the dimple and plunger are not present. FIG. 17 illustrates a tool engaging a lockbolt wherein the longitudinal axis of the lockbolt is misaligned with that of the tool. Due to the depth of the single pull groove 20, the tool and lockbolt are maintained in engagement despite the angular misplacement. The angular alignment of the lockbolt 2 relative to the tool is corrected on actuation of the tool 100.

An alternative embodiment of lockbolt according to the present invention includes full swage indication means. In the example of FIGS. 5d to 5f, the full swage indication means comprises projections 58 provided on an outer surface 13' of a flange 11' of the collar 10'. On installation of a lockbolt, once the anvil portion 112 of the installation tool 100 has reached the projections 58, the projections 58 are caused to be at least partially deformed.

Figure 18C:
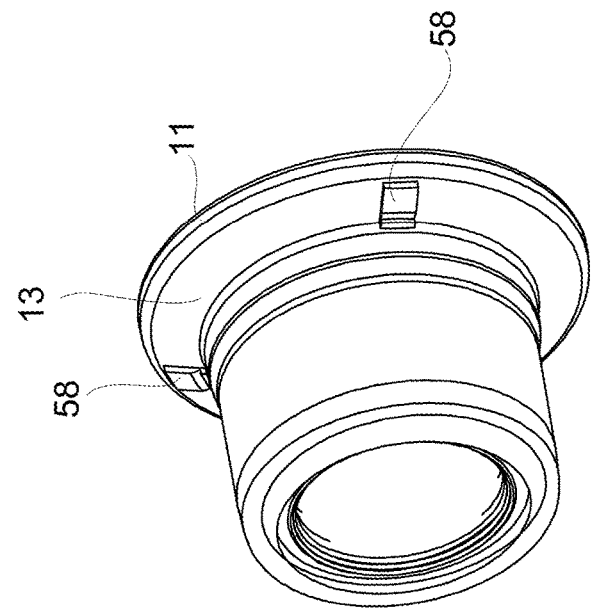
Figure 18B:
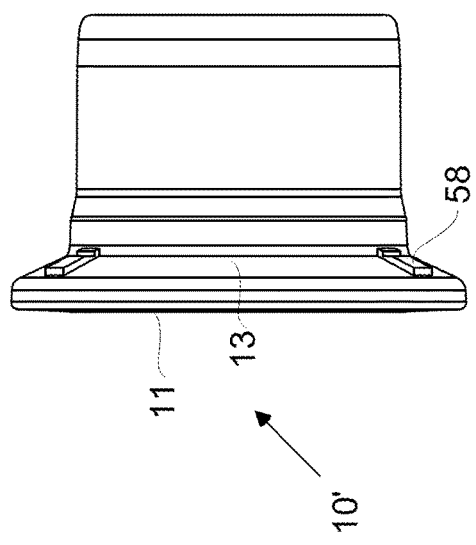
Figure 18A:
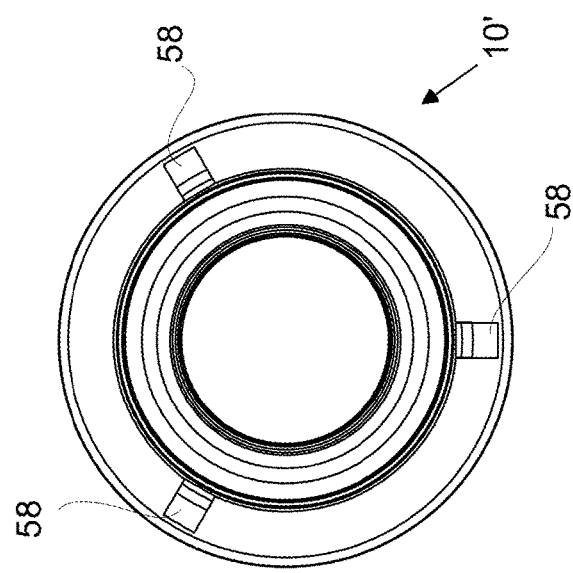
FIG. 18a is an end view of the alternative collar of FIGS. 5d to 5f after installation (lockbolt pin and workpiece removed for clarity)

The projections 58 will not depress until the anvil portion 112 has reached a point such that the collar 10' has been fully swaged onto the pin tail 6. Accordingly, when the installation tool 100 is withdrawn from the lockbolt, the operator can check that the projections 58 have at least partially depressed, thereby confirming full swaging of the collar 10' onto the pin tail 6. FIGS. 18a to 18c show the collar of FIGS. 5d to 5f after installation (the lockbolt pin and workpiece into which the lockbolt is installed have been removed for clarity). Projections 58 have been partially deformed by the anvil portion 112. As three projections 58 are provided at equal distances around the collar 10', the operator can confirm that the collar 10' has been fully swaged onto the pin tail 6 around the entire circumference of the collar 10'.

Figure 19B:
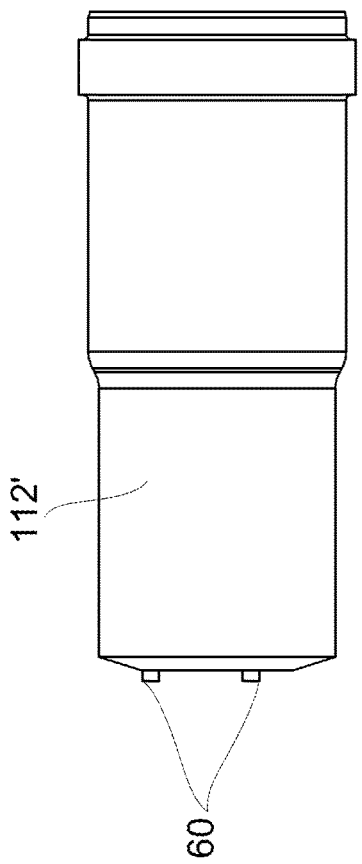
Figure 19A:
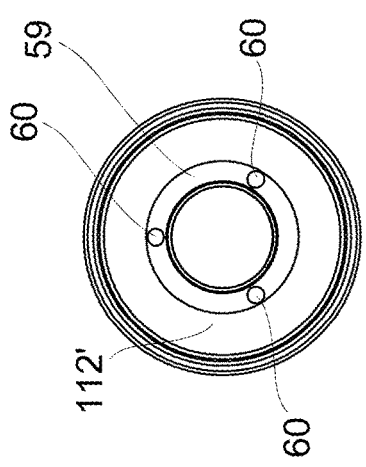
FIG. 19a is an end view of an anvil of an alternative installation tool anvil portion in accordance with the present invention.
Figure 19C:
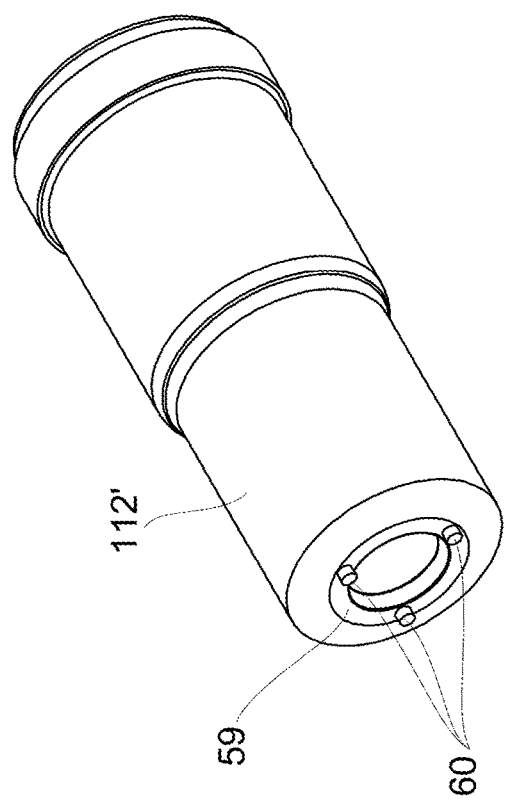

In an alternative embodiment, as shown in FIGS. 19a to 19c, the full swage indication means comprises one or more projections 60 provided on an end face 59 of the anvil portion 112' of the tool, wherein the projections 60 are situated such that when the collar 10 has been fully swaged onto the pin tail 6, the projections 60 are caused to depress into the outer surface 13 of the flange 11 of the collar 10, thereby to indicate, on removal of the installation tool 100 from the lockbolt, that the collar 10 has been fully swaged onto the pin tail 6. Again, as three equally spaced protrusions 60 are provided, the operator can confirm that the collar 10 has been fully swaged onto the pin tail 6 around the entire circumference of the collar 10.

The invention claimed is:

1. Apparatus for installing a lockbolt comprising a lockbolt comprising a collar and a pin;
   the pin comprising, along a longitudinal axis, a pin head and a pin tail adapted to be inserted through aligned apertures in workpiece members;
   the pin tail comprising a locking portion comprising locking grooves, and only a single pull groove, the single pull groove including a first tapered section, a second tapered section and a plain portion longitudinally between the first tapered section and the second tapered section, the single pull groove being provided between the locking portion and an end face of the pin tail remote from the pin head, one of the tapered sections of the single pull groove providing a contact surface, and an end portion provided between the pull groove and the end face;

the collar being adapted to be fitted over the locking grooves and swaged onto the locking grooves, the collar including full swage indication means comprising one or more rectangular projections provided on a flange of the collar, the one or more projections extending radially outwardly along a surface of the flange, and an installation tool comprising a collet surrounded by a nosepiece, the nosepiece being provided with a tapered anvil section.

2. The apparatus as claimed in claim 1 wherein the installation tool further comprises a depressible plunger, wherein the tool is disabled whilst the plunger is not depressed.

3. The apparatus as claimed in claim 2 wherein the plunger has a rounded tip which is engageable with a dimple provided in the end face of the lockbolt pin tail.

4. The apparatus as claimed in claim 1 wherein part of the collet has a shape complementary to at least part of the shape of the pull groove.

5. The apparatus as claimed in claim 1, wherein the tool further comprises at least one protrusion provided on the anvil portion, wherein the at least one protrusion is configured to deform an outer surface of a flange of the collar on installation of the lockbolt.

6. A lockbolt comprising:
a collar and a pin;
the pin comprising, along a longitudinal axis, a pin head and a pin tail adapted to be inserted through aligned apertures in workpiece members;
the pin tail comprising a locking portion comprising locking grooves, and only a single pull groove, the single pull groove including a first tapered section, a second tapered section and a plain portion longitudinally between the first tapered section and the second tapered section, the single pull groove being provided between the locking portion and an end face of the pin tail remote from the pin head, one of the tapered sections of the single pull groove providing a contact surface, and an end portion provided between the pull groove and the end face;
the collar being adapted to be fitted over the locking grooves and swaged onto the locking grooves, the collar including full swage indication means comprising one or more rectangular projections provided on a flange of the collar, the one or more projections extending radially outwardly along a surface of the flange.

7. The lockbolt as claimed in claim 6 wherein a ratio of the length of the pin tail over which the end portion extends, to a maximum diameter of the locking portion, is within the range 0.26 to 0.5.

8. The lockbolt as claimed in claim 7 wherein a retaining feature comprises a helical screw thread provided on a section of the locking portion adjacent the pull groove, and at least one corresponding screw thread provided on a section of the locking portion adjacent the pull groove, and at least one corresponding screw thread, helix or tab provided in the throughbore of the collar into which the helical screw thread provided on the locking portion engages.

9. The lockbolt as claimed in claim 7 wherein a retaining feature comprises a shallow axial slot or flat provided on the pin tail, which allows a tab provided on the throughbore of the collar to pass down to a first locking groove of the locking portion, into which the collar tab can be rotated to engage, in a 'push-and-twist' motion.

10. The lockbolt as claimed in claim 7 wherein a retaining feature comprises an elastomeric bead or ring, provided either on the throughbore of the collar or on the locking grooves of the pin tail.

11. The lockbolt as claimed in claim 6, wherein the combined length of the pull groove and end portion is shorter than the locking portion, and has a maximum diameter which is smaller than a maximum diameter of the locking portion.

12. The lockbolt as claimed in claim 6 wherein a ratio of a minimum diameter of the single pull groove to a maximum diameter of the locking portion is within the range 0.50 to 0.78.

13. The lockbolt as claimed in claim 6 wherein a ratio of a maximum diameter of the end portion to a maximum diameter of the locking portion is within the range 0.7 to 1.0.

14. The lockbolt as claimed in claim 6 wherein a ratio of the total length of the pin tail over which the locking groove and the end portion extends, to a maximum diameter of the locking portion, is within the range 0.7 to 1.2.

15. The lockbolt as claimed in claim 6 wherein a ratio of the length of the pin tail over which the pull groove extends, to a maximum diameter of the locking portion, is within the range 0.3 to 0.7.

16. The lockbolt as claimed in claim 6 wherein the plain portion of the pull groove has a constant cross-sectional area throughout its length.

17. The lockbolt as claimed in claim 6 further comprising a retaining feature to retain the collar in an initial assembly position on the pin.

18. The lockbolt as claimed in claim 6 wherein the pin tail further includes a stepped portion adjacent the pull groove and between the pull groove and the end face of the pin tail remote from the pin head, wherein the stepped portion has a greater cross-sectional area than that of the end portion.

19. The lockbolt as claimed in claim 6 further comprising a plain portion between the pin head and the locking portion, wherein the ratio of the length of the plain portion to the length of the locking portion is in the range 0.62 to 1.27 for pins of a length capable of fastening a total joint thickness of at least three times the nominal pin diameter.

20. The lockbolt as claimed in claim 6 wherein the one or more projections are configured to at least partly deform or break off under the force of an anvil portion of an installation tool.

* * * * *